US009601950B2

(12) United States Patent
Yamamura et al.

(10) Patent No.: US 9,601,950 B2
(45) Date of Patent: Mar. 21, 2017

(54) PERMANENT MAGNET MOTOR

(75) Inventors: Akihiro Yamamura, Chiyoda-ku (JP); Kazuhisa Takashima, Chiyoda-ku (JP); Masatsugu Nakano, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 691 days.

(21) Appl. No.: 14/005,992

(22) PCT Filed: May 26, 2011

(86) PCT No.: PCT/JP2011/062087
§ 371 (c)(1),
(2), (4) Date: Sep. 18, 2013

(87) PCT Pub. No.: WO2012/160692
PCT Pub. Date: Nov. 29, 2012

(65) Prior Publication Data

US 2014/0009023 A1 Jan. 9, 2014

(51) Int. Cl.

*H02K 1/27* (2006.01)
*H02K 29/03* (2006.01)
*H02K 21/16* (2006.01)

(52) U.S. Cl.
CPC ........... *H02K 1/2706* (2013.01); *H02K 29/03* (2013.01); *H02K 21/16* (2013.01); *H02K 2213/03* (2013.01)

(58) Field of Classification Search
CPC ............................ H02K 29/03; H02K 1/2706
(Continued)

(56) References Cited

U.S. PATENT DOCUMENTS 5,729,072 A * 3/1998 Hirano .................. H02K 1/148 310/179
6,226,856 B1 * 5/2001 Kazama .................. H02K 1/12 29/596
(Continued)

FOREIGN PATENT DOCUMENTS

CN 1613172 A 5/2005
EP 2211442 A1 7/2010
(Continued)

OTHER PUBLICATIONS

Communication dated Aug. 21, 2015 from the European Patent Office in counterpart application No. 11866303.8.
(Continued)

*Primary Examiner* — Naishadh Desai
(74) *Attorney, Agent, or Firm* — Sughrue Mion, PLLC; Richard C. Turner

(57) ABSTRACT

A permanent magnet motor (1) is configured such that mN≠K is satisfied to an integer m, where the pole number of a rotor (3) is K and the number of divided iron cores (10-12) of a stator (2) is N, and N values of r(θ), r(θ+360°/N), . . . , r(θ+(i−1)×360°/N), . . . , r(θ+(N−1)×360°/N) are equal so that the absolute value of the difference between any two of the N values becomes up to a predetermined value, where r(θ) is an inner radius defined as, on a plane perpendicular to a rotary shaft (7) of the rotor (3), a distance from the rotary shaft (7) center to a surface of the stator iron core (4) facing the rotor (3) where an angle from a fitting portion (15) of the partial iron core (10) is θ on the perpendicular plane, θ taking 0 to 360°/N.

17 Claims, 27 Drawing Sheets

(58) Field of Classification Search
USPC .......... 310/156.01, 216, 8, 216.009, 216.011
See application file for complete search history.

(56) References Cited

U.S. PATENT DOCUMENTS

| | | | | |
|---|---|---|---|---|
| 6,369,687 | B1 * | 4/2002 | Akita | H02K 1/148 310/216.011 |
| 7,120,985 | B2 * | 10/2006 | Nouzumi | H02K 1/148 29/596 |
| 7,122,933 | B2 * | 10/2006 | Horst | H02K 3/18 310/179 |
| 7,126,248 | B2 * | 10/2006 | Nishiyama | F04B 35/04 310/216.065 |
| 7,345,397 | B2 * | 3/2008 | Sheeran | H02K 1/148 310/216.009 |
| 7,348,706 | B2 * | 3/2008 | Ionel | H02K 1/148 310/216.009 |
| 9,136,735 | B2 * | 9/2015 | Hashimoto | H02K 1/148 |
| 2004/0222715 | A1 * | 11/2004 | Yamamura | H02K 1/148 310/216.015 |
| 2006/0244335 | A1 | 11/2006 | Miyazaki et al. | |
| 2009/0072647 | A1 * | 3/2009 | Hino | B60L 3/0061 310/156.15 |
| 2009/0134739 | A1 * | 5/2009 | Akita | H02K 1/148 310/216.004 |
| 2010/0207475 | A1 | 8/2010 | Kawasaki et al. | |

FOREIGN PATENT DOCUMENTS

| | | | |
|---|---|---|---|
| JP | 9191588 | A | 7/1997 |
| JP | 3017085 | B2 | 12/1999 |
| JP | 2002-345224 | A | 11/2002 |
| JP | 2004-274970 | A | 9/2004 |
| JP | 2006-60879 | A | 3/2006 |
| JP | 2006-304495 | A | 11/2006 |
| JP | 2007-68323 | A | 3/2007 |
| JP | 2010-63281 | A | 3/2010 |
| JP | 2010-193609 | A | 9/2010 |

OTHER PUBLICATIONS

Communication dated Feb. 3, 2016, from the State Intellectual Property Office of People's Republic of China in counterpart Application No. 201180071130.9.
Communication dated Jun. 3, 2015 from the State Intellectual Property Office of the People's Republic of China in counterpart application No. 201180071130.9.
Japanese Office Action, dated Jun. 24, 2014, Patent Application No. 2013-516145.
International Search Report for PCT/JP2011/062087 dated Aug. 9, 2011.
Communication dated Feb. 3, 2015 from the Japanese Patent Office in counterpart application No. 2013-516145.

* cited by examiner 41
42
6
46
45
44
16
5
13
15
8
14
47
43
9

PERMANENT MAGNET MOTOR

TECHNICAL FIELD

The present invention relates to a stator of a permanent magnet motor, and particularly, to the configuration of a stator iron core for reducing cogging torque.

BACKGROUND ART

As a configuration of a stator of a rotary electric machine, its iron core may be integrally formed in a circular tube shape. In this configuration, since the inner circumference of the stator can be formed in a substantially exact circular shape, there is an advantage that cogging torque due to permeance pulsation at a gap portion of a motor hardly occurs. On the other hand, there are the following problems. Since the iron core needs to be formed in a circular shape, particularly, in the case of using a laminated iron core, materials of the inner and outer circumferential portions cannot be utilized, and therefore the material yield is low. In addition, since a conductive wire is wound in a narrow slot portion on the inner circumference, the occupancy rate of the conductive wire decreases.

In order to solve the above problems, a configuration has been proposed that a foldable joint portion is provided on a stator so that the stator can be linearly expanded (for example, see Patent Document 1).

This configuration has an advantage that the material yield is improved and winding is facilitated, as compared to the conventional configuration of integrally forming an iron core in a circular tube shape.

In addition, a configuration has been proposed that a stator is formed by joining L pieces of divided iron cores (L is a stator tooth number) for respective teeth (for example, see Patent Document 2).

This configuration has an advantage that the material yield is improved and winding is facilitated, as compared to the conventional configuration of integrally forming an iron core in a circular tube shape.

CITATION LIST

Patent Document

Patent Document 1: Japanese Patent No. 3017085 (Paragraphs [0018] and [0019] and FIG. 1)

Patent Document 2: Japanese Laid-Open Patent Publication No. 2006-304495 (Paragraphs [0016] to [0019] and FIG. 1)

SUMMARY OF THE INVENTION

Problems to be Solved by the Invention

The configuration of Patent Document 1 has the following problems. Since the linear iron core is folded into a circular tube shape, the inner circumference of the stator does not become an exact circular shape. Particularly, since a part where linear end portions are butted to each other is discontinuous, this part has an inner circumference shape different from that of the other folded part. In addition, due to such distortion of the inner circumference shape, permeance pulsation occurs at the gap portion of the motor, and particularly, the K-th order component of cogging torque depending on a pole number K of a rotor increases.

The configuration of Patent Document 2 has the following problems. There are a large number of parts, and workability of joining of iron cores, connection of wound conductive wires, and the like is low. In addition, upon joining of the divided iron core pieces, discontinuity occurs at each tooth on the inner circumference, and then, due to the resultant distortion of the inner circumference shape, permeance pulsation occurs at the gap portion of the motor, whereby cogging torque increases.

In order to solve the above problems, an object of the present invention is to, in a permanent magnet motor having distortion of a stator inner circumference shape, in which the pole number of a rotor is K, drastically reduce the K-th order component of cogging torque in permeance pulsation at a gap portion of the permanent magnet motor.

Solution to the Problems

A permanent magnet motor according to the present invention is configured such that a relationship of $mN \neq K$ is satisfied with respect to an integer m, where the pole number of a rotor is K and the number of partial iron cores of a stator iron core of a stator is N, and N values of $r(\theta)$, $r(\theta+360°/N)$, . . . , $r(\theta+(i-1)\times 360°/N)$, . . . , $r(\theta+(N-1)\times 360°/N)$ are set to be equal so that the absolute value of the difference between any two values of the N values becomes equal to or smaller than a predetermined value, where $r(\theta)$ is an inner radius defined as, on a plane perpendicular to a rotary shaft of the rotor, a distance from the center of the rotary shaft to a point on a surface of the stator iron core facing to the rotor at which an angle from a fitting portion of the partial iron core is $\theta$ on the perpendicular plane, $\theta$ taking a value of 0 to 360°/N.

Effect of the Invention

The permanent magnet motor according to the present invention is configured such that a relationship of $mN \neq K$ is satisfied with respect to an integer m, where the pole number of a rotor is K and the number of partial iron cores of a stator iron core of a stator is N, and N values of $r(\theta)$, $r(\theta+360°/N)$, . . . , $r(\theta+(i-1)\times 360°/N)$, . . . , $r(\theta+(N-1)\times 360°/N)$ are set to be equal so that the absolute value of the difference between any two values of the N values becomes equal to or smaller than a predetermined value, where $r(\theta)$ is an inner radius defined as, on a plane perpendicular to a rotary shaft of the rotor, a distance from the center of the rotary shaft to a point on a surface of the stator iron core facing to the rotor at which an angle from a fitting portion of the partial iron core is $\theta$ on the perpendicular plane, $\theta$ taking a value of 0 to 360°/N. Therefore, even if the stator inner circumference shape is distorted, the K-th order component of cogging torque in permeance pulsation at a gap portion of the permanent magnet motor can be drastically reduced.

DESCRIPTION OF EMBODIMENTS

Embodiment 1

Figure 1:
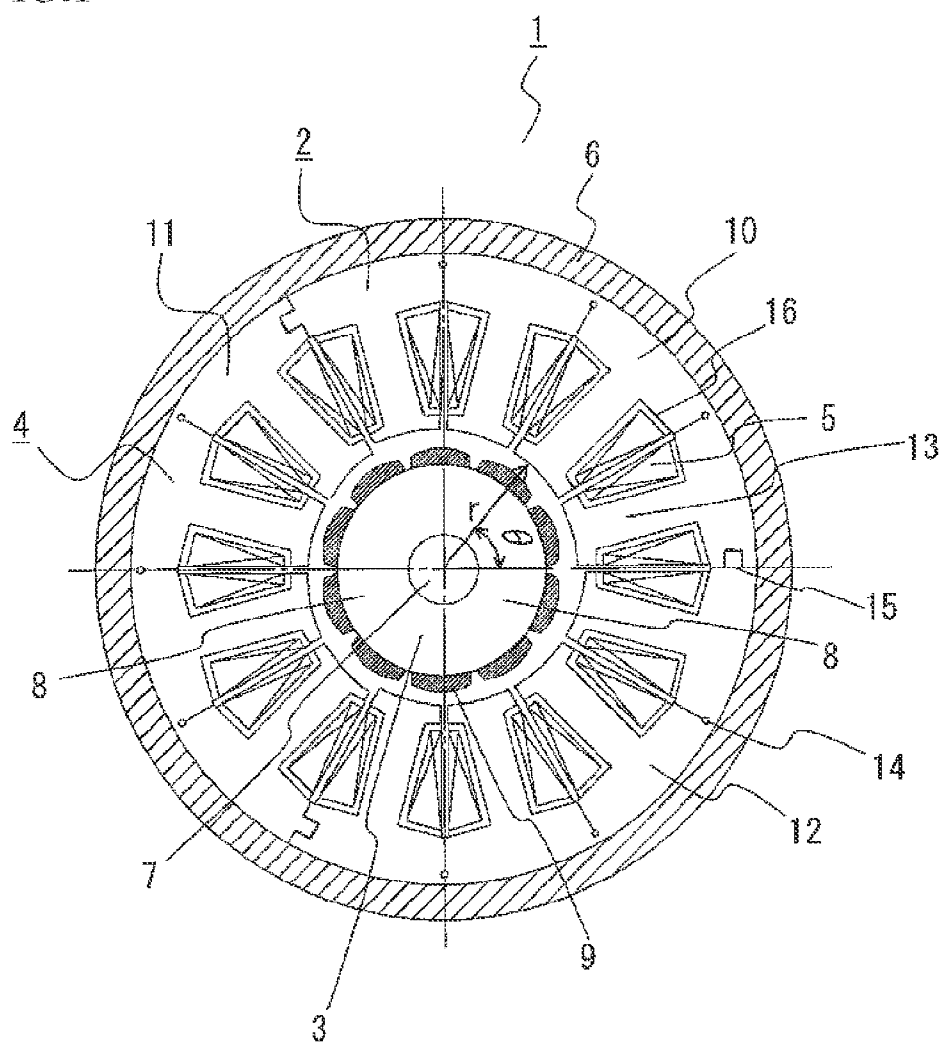
FIG. 1 is a sectional view according to a permanent magnet motor of embodiment 1 of the present invention.
Figure 2:
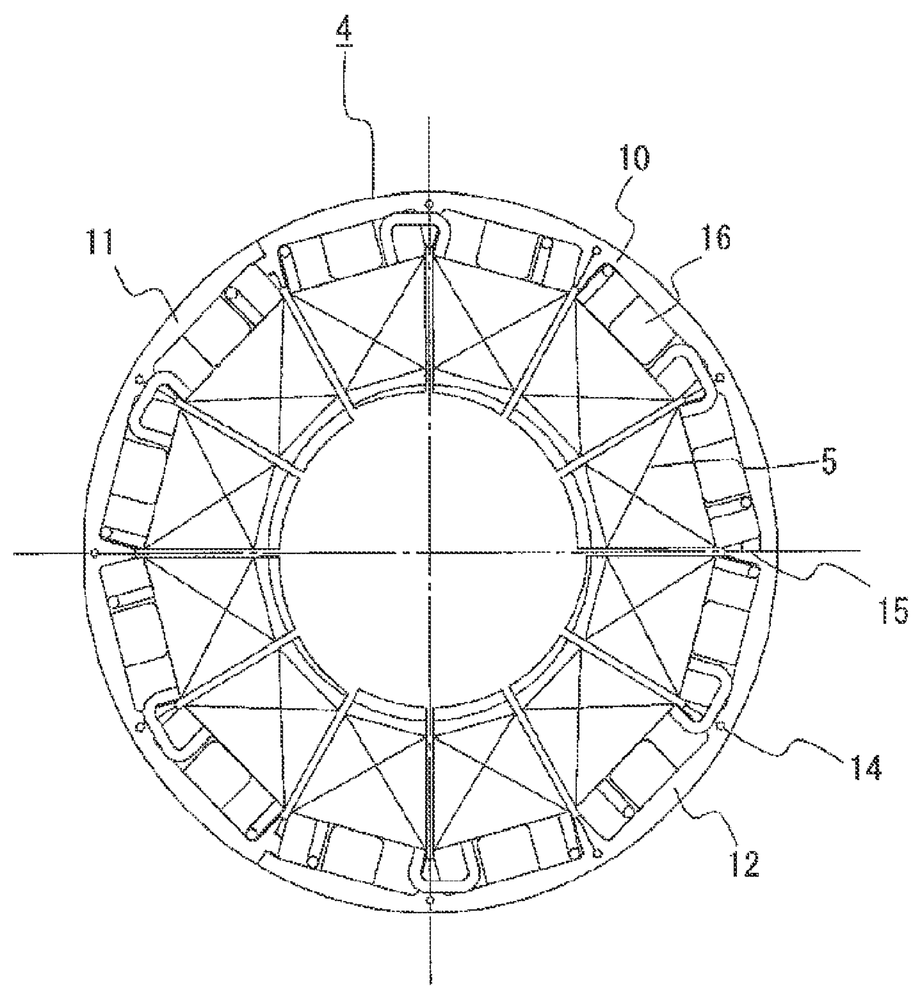
FIG. 2 is a plane view of a stator according to the permanent magnet motor of embodiment 1 of the present invention.
Figure 3:
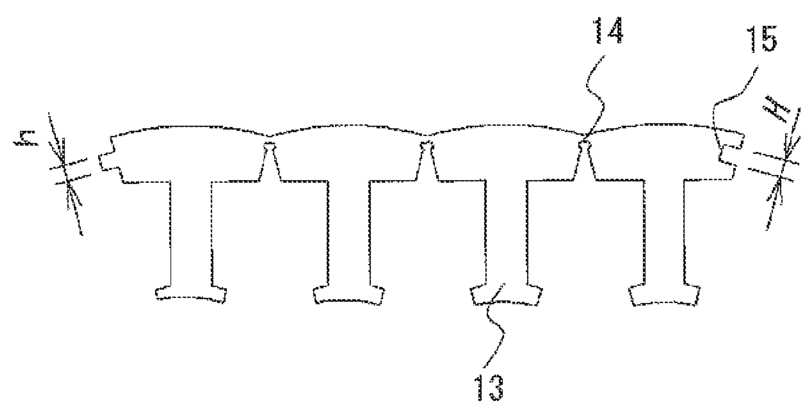
FIG. 3 is a plane view of the stator before assembly according to the permanent magnet motor of embodiment 1 of the present invention.
Figure 4:
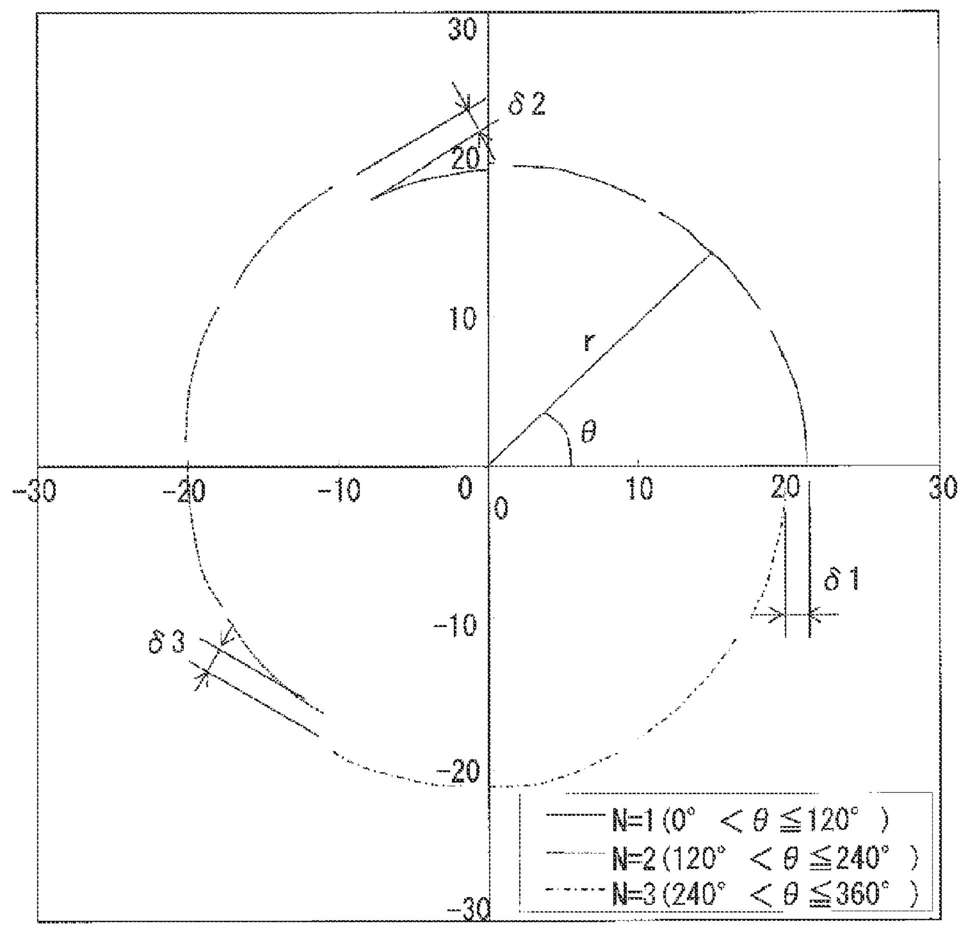
FIG. 4 is a schematic diagram of a stator inner circumference shape according to the permanent magnet motor of embodiment 1 of the present invention.
Figure 5:
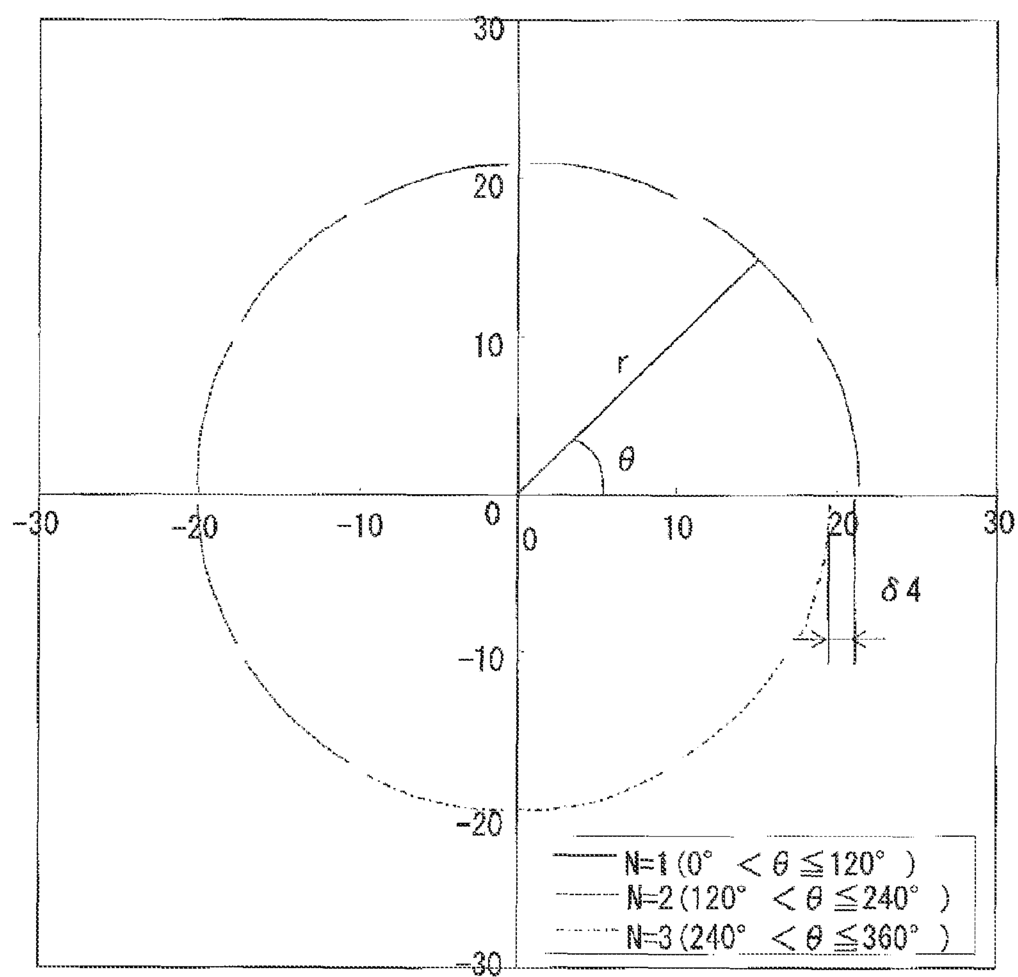
FIG. 5 is a schematic diagram of a stator inner circumference shape according to the permanent magnet motor of embodiment 1 of the present invention.
Figure 6:
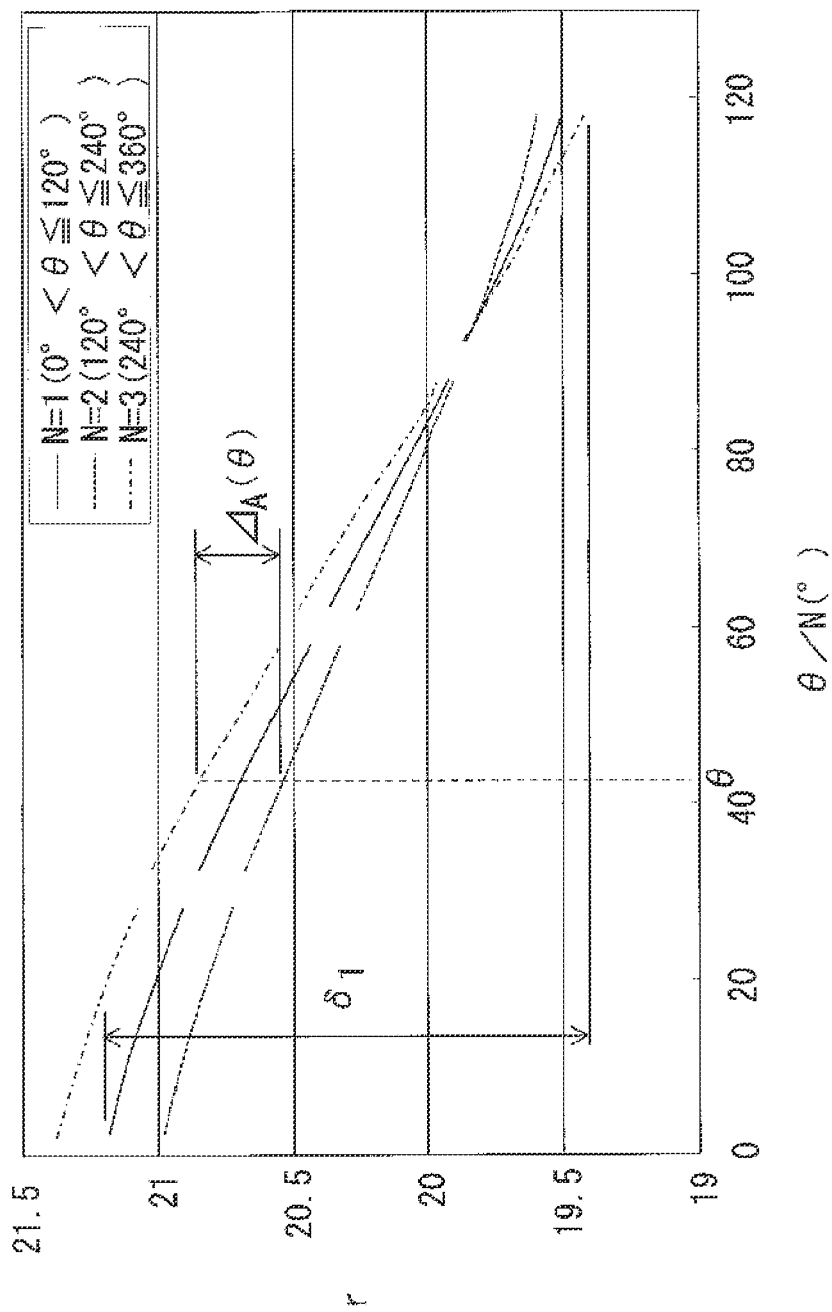
FIG. 6 is an explanation diagram of a stator inner circumference shape according to the permanent magnet motor of embodiment 1 of the present invention.
Figure 7:
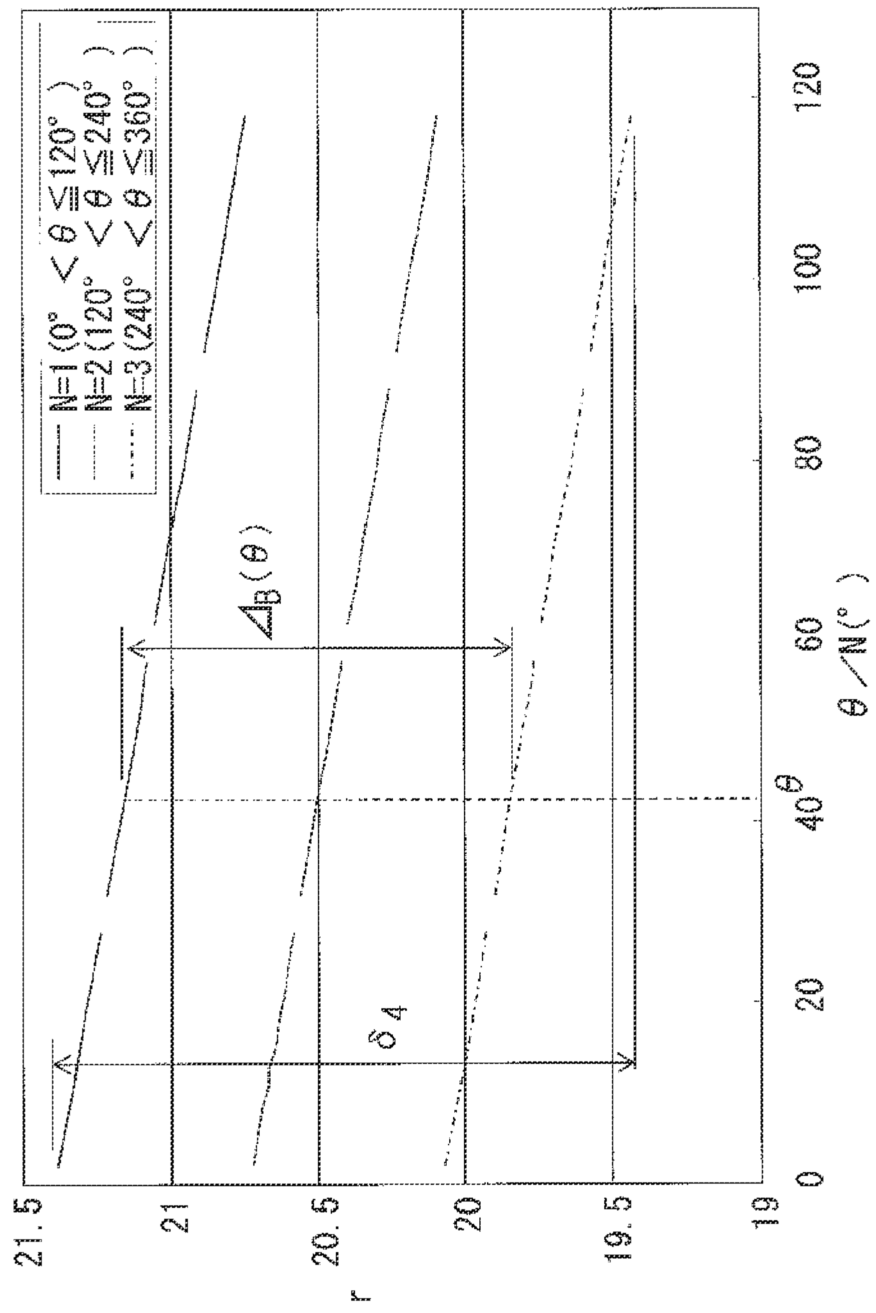
FIG. 7 is an explanation diagram of a stator inner circumference shape according to the permanent magnet motor of embodiment 1 of the present invention.
Figure 8:
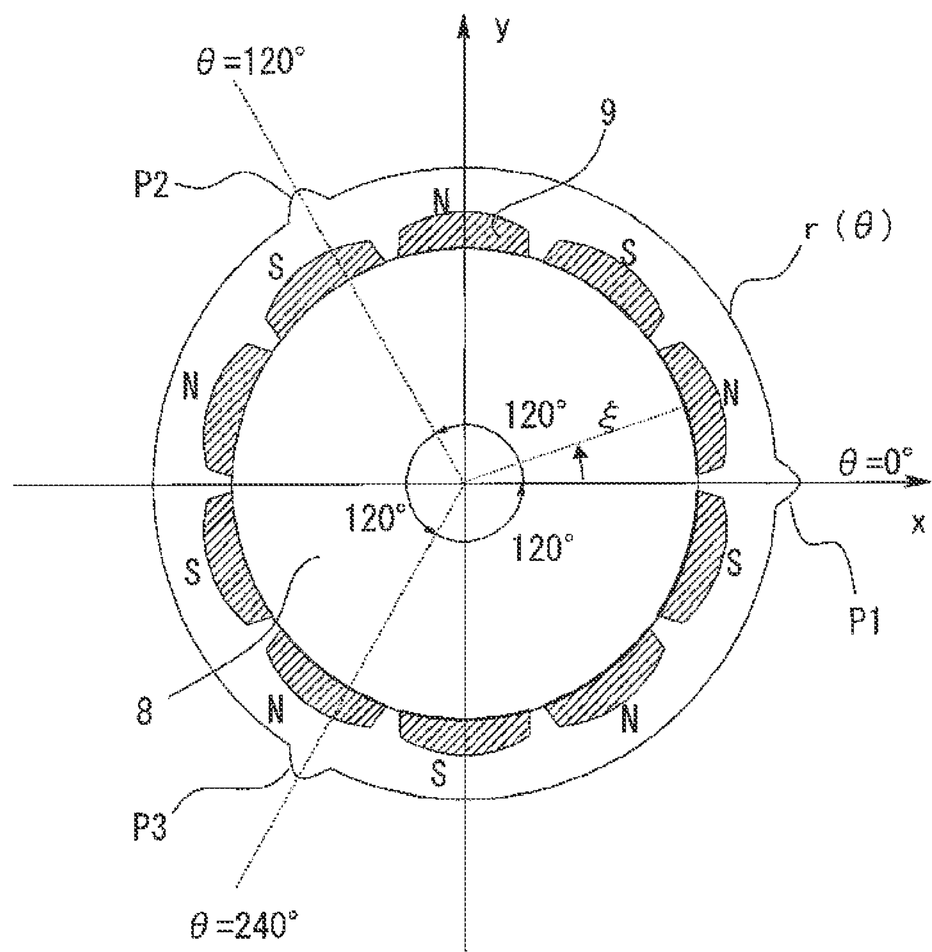
FIG. 8 is a cogging torque reduction principle explanation diagram according to the permanent magnet motor of embodiment 1 of the present invention.
Figure 9:
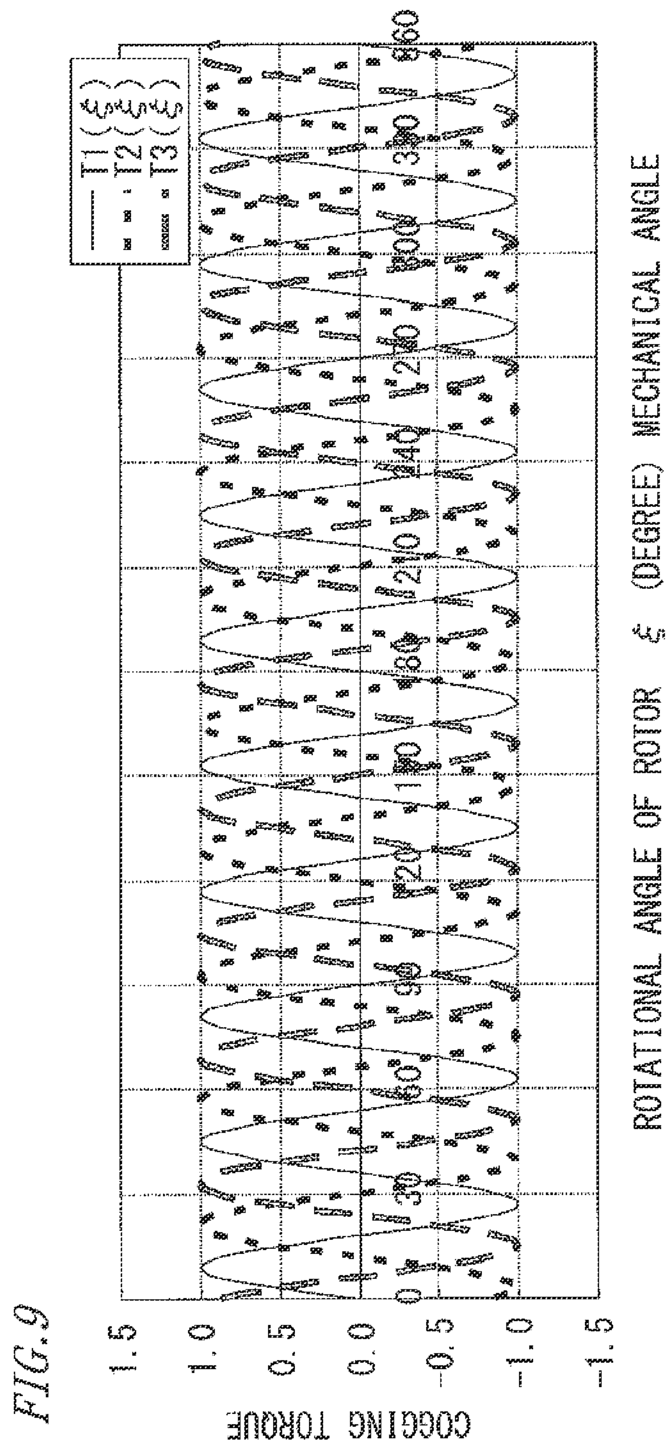
FIG. 9 is a cogging torque reduction principle explanation diagram according to the permanent magnet motor of embodiment 1 of the present invention.
Figure 10:
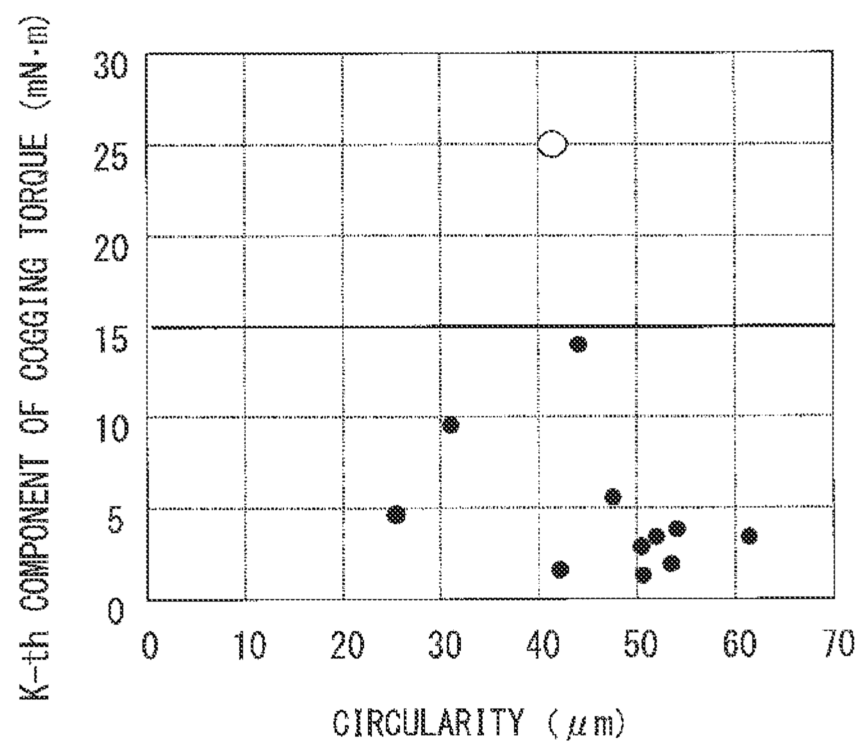
FIG. 10 is a relationship diagram between the stator inner circumference shape and cogging torque according to the permanent magnet motor of embodiment 1 of the present invention.
Figure 11:
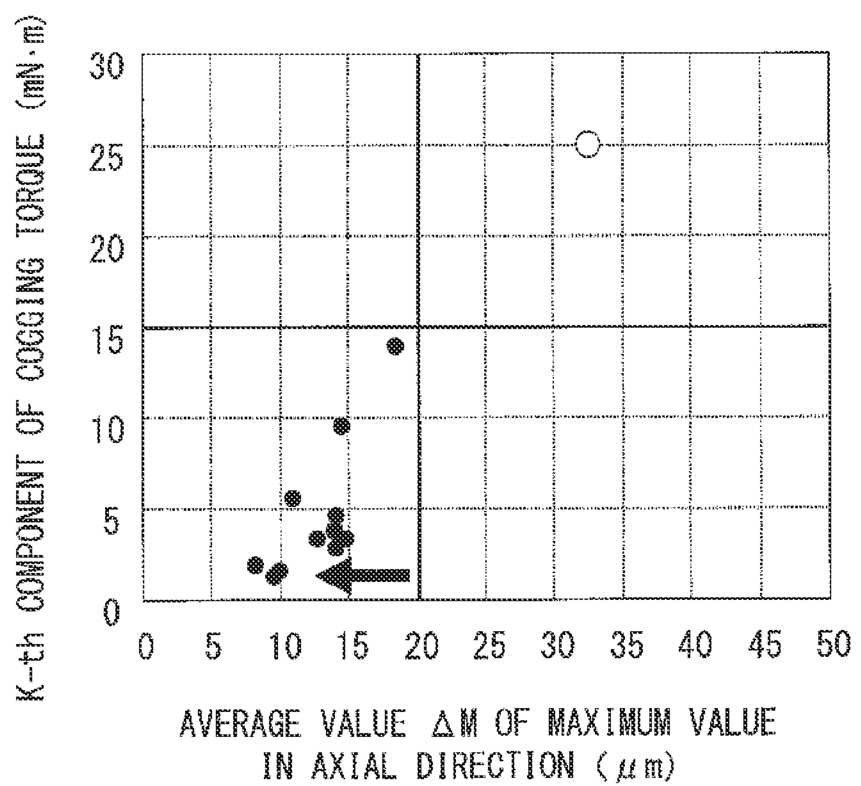
FIG. 11 is a relationship diagram between the stator inner circumference shape and cogging torque according to the permanent magnet motor of embodiment 1 of the present invention.
Figure 12:
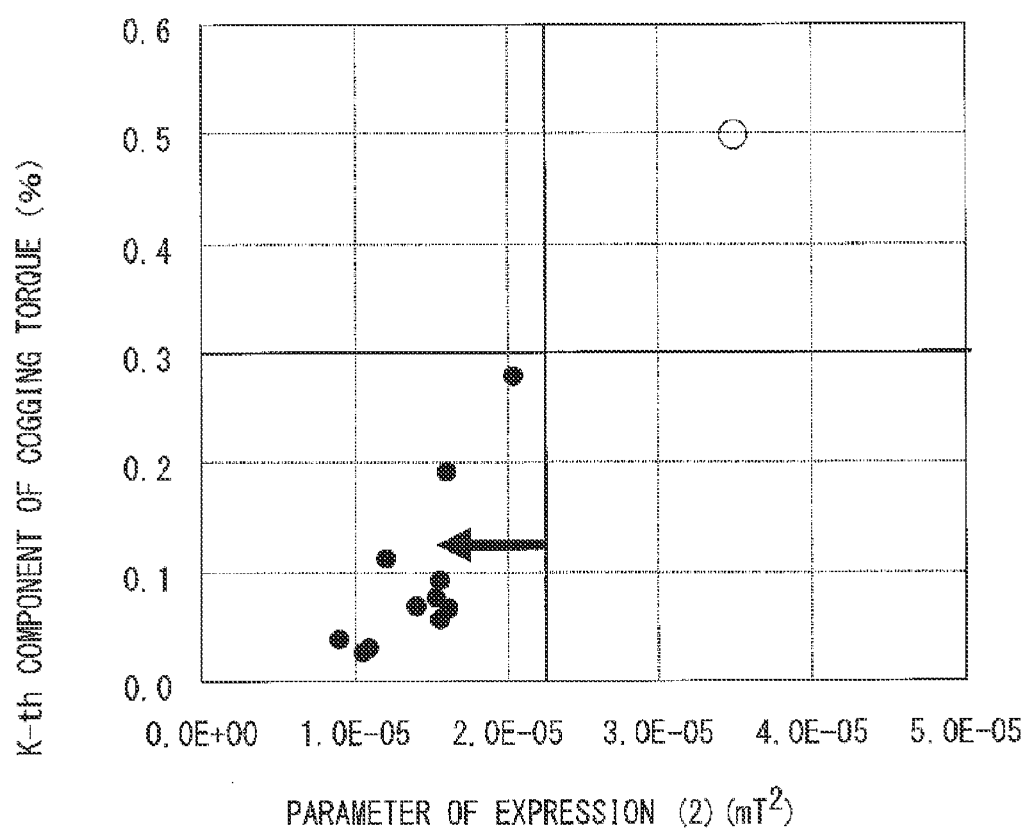
FIG. 12 is a relationship diagram between the stator inner circumference shape and cogging torque according to the permanent magnet motor of embodiment 1 of the present invention.
Figure 13:
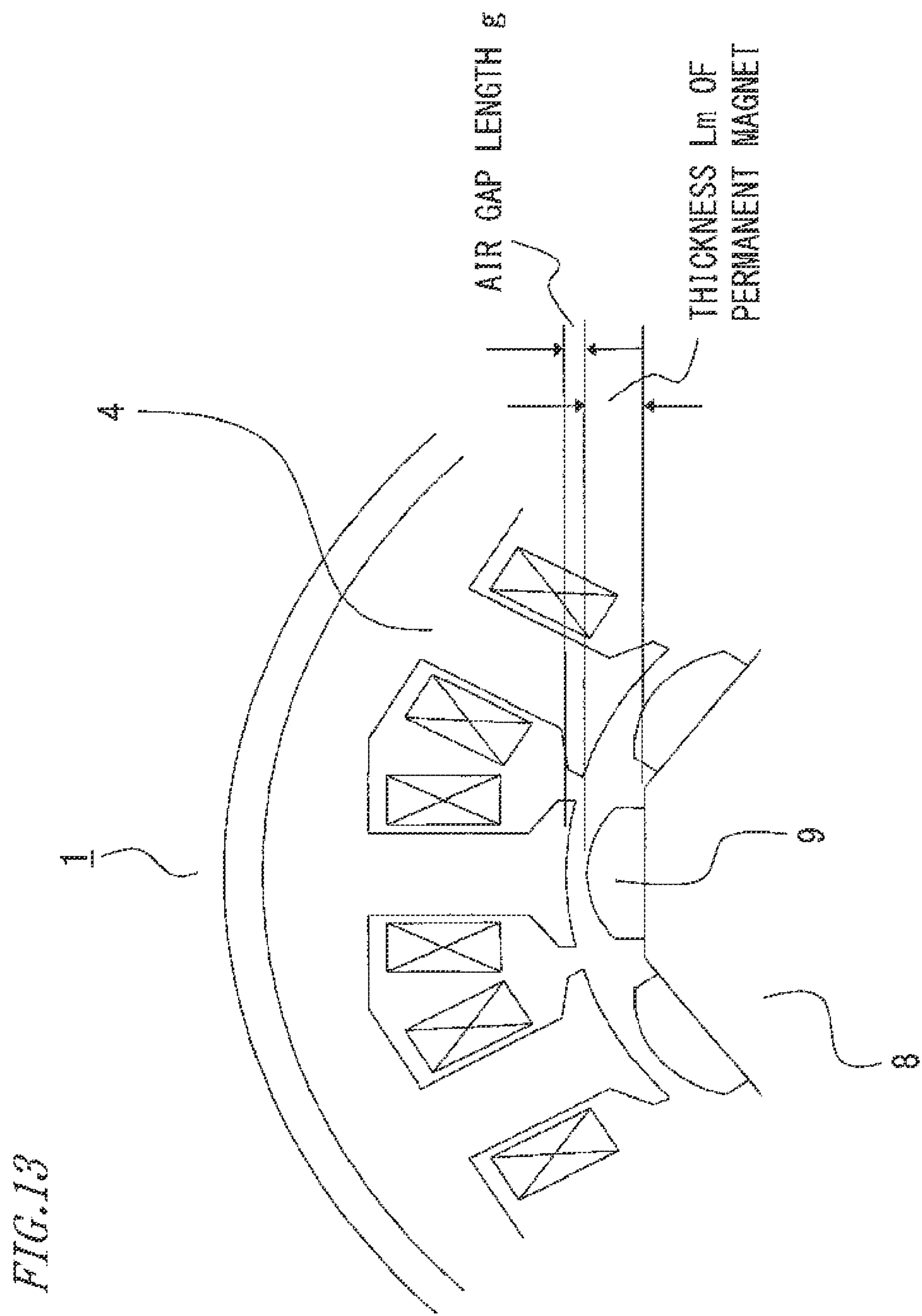
FIG. 13 is an explanation diagram of a permanent magnet and an air gap according to the permanent magnet motor of embodiment 1 of the present invention.

Hereinafter, embodiment 1 of the present invention will be described based on the drawings. FIG. 1 is a sectional view of a permanent magnet motor 1 according to embodiment 1 of the present invention. FIG. 2 is a plane view of a stator. FIG. 3 is a plane view of the stator before assembly. FIGS. 4 and 5 are schematic diagrams of a stator inner circumference shape. FIGS. 6 and 7 are explanation diagrams of the stator inner circumference shape. FIGS. 8 and 9 are cogging torque reduction principle explanation diagrams. FIGS. 10 to 12 are relationship diagrams between the stator inner circumference shape and cogging torque. FIG. 13 is an explanation diagram of a permanent magnet and an air gap.

Hereinafter, the configuration and the function of the permanent magnet motor 1 according to embodiment 1 of the present invention will be described first, and then the principle of cogging torque reduction according to the present invention will be described.

The configuration and the function of the permanent magnet motor 1 according to embodiment 1 of the present invention will be described based on FIGS. 1 to 7.

In FIG. 1, the permanent magnet motor 1 is composed of a stator 2 and a rotor 3. The rotor 3 has 10 poles, and the stator 2 has 12 slots.

The stator 2 is composed of a stator iron core 4, an armature winding 5, a yoke 6, partial iron cores 10, 11, and 12, a tooth 13, a thin body portion 14, a fitting portion 15, and a bobbin 16. The rotor 3 is composed of a rotary shaft 7, a rotor iron core 8, and a permanent magnet 9. It is noted that the thin body portion is a kind of joint portion described later in embodiment 2.

The stator iron core 4 is formed by laminating, by means such as swaging, planar magnetic materials such as electromagnetic steel sheets punched by a press mold, and the partial iron cores 10, 11, and 12 are punched by the same mold.

In addition, the partial iron cores 10, 11, and 12 are each composed of four teeth 13 joined at the thin body portion 14 on the outer circumference. Each partial iron core is punched by a mold and laminated in a state shown in FIG. 3, the bobbin 16 is attached and wound with a wire, and then the partial iron core is folded at the thin body portion 14, to be formed in an arc shape.

The armature winding 5 is continuously wound on two adjacent teeth, and two pairs of such teeth are included in each partial iron core, as shown in FIG. 2.

The partial iron cores 10, 11, and 12 have concave and convex fitting portions 15 at their end portions so that they can be fitted into each other, with clearances $\delta_A$ ($\delta_A$=H−h in FIG. 3) provided in the radial direction.

After winding, the partial iron cores 10, 11, and 12 formed in an arc shape are formed in a circular tube shape by fitting the fitting portions 15 at their end portions into each other, and then the outer circumference of the fitting portion is fixed by welding. Then, connection (not shown) of a winding conductive wire terminal of the armature winding, and press fit to the yoke, are conducted. Thus, the stator 2 is formed.

In the stator 2 configured as described above, the partial iron cores 10, 11, and 12 punched by the same press mold are each placed by an angle of 120 degrees, the clearance δA is provided for the fitting among the partial iron cores 10, 11, and 12, and the shape difference due to punching by a press mold or lamination is set at δB. As shown in FIGS. 1 and 4, on a plane perpendicular to the rotary shaft of the rotor, the distance from the rotary shaft center to a point on a surface of the stator iron core facing to the rotor, where the angle from the fitting portion of the partial iron core is θ on the perpendicular plane, is defined as an inner radius r(θ). With respect to a maximum value r(θ)max and a minimum value r(θ)min among r(θ), r(θ+360°/3)=r(θ+120°), and r(θ+2*360°/3)=r(θ+240°) when θ can take a value of 0 to 360°/3, a periodic shape difference Δ(θ) per 360°/N=120° can be represented as follows.

$$\Delta(\theta)=r(\theta)\max-r(\theta)\min\leq\delta A+\delta B$$

On the other hand, in the case where eleven foldable joint portions (i.e., the thin body portion 14) are provided on the stator such that the stator can be linearly expanded, if the inner circumference circularity is set at ϕ, similarly, a shape difference Δ'(θ) per 120° with respect to the angle θ (0 to 360°) is represented as follows.

$$\Delta'(\theta)=r(\theta)\max-r(\theta)\min\leq 2\phi$$

For example, if $\delta_A$=20 μm, $\delta_B$=20 μm, and ϕ=100 μm are set as realizable values, the following are obtained.

$$\Delta(\theta)\leq\delta_A+\delta_B=40\ \mu m$$

$$\Delta'(\theta)\leq 2\phi=200\ \mu m$$

Thus, it is found that there is a high possibility of Δ'(θ)>Δ(θ).

FIG. 4 shows the inner circumference shape of the stator 2 composed of three partial iron cores having a positional displacement in the radial direction at the fitting portion 15. To compare with the configuration of embodiment 1 of the present invention, a stator having a circularity equal to the inner circumference circularity of the stator shown in FIG. 4 and having eleven foldable joint portions, will be assumed. FIG. 5 shows an example of the inner circumference shape in the case of having a linearly expandable configuration and a positional displacement in the radial direction at a portion where end portions are connected to each other in an expanded state.

FIGS. 6 and 7 show the inner circumference dimensions per 120° of these stators. Although they have the same inner circumference circularity, $\Delta_A(\theta)<\Delta_B(\theta)$ is obvious from comparison between the periodic shape difference $\Delta_A(\theta)$ of the stator shown in FIG. 6 which is composed of three partial iron cores and the shape difference $\Delta_B(\theta)$ of the stator shown in FIG. 7 which is composed of an integrally formed iron core which has a linear configuration when expanded.

Thus, it is found that the effect is obtained that cogging torque of the stator in FIG. 6 becomes drastically smaller than cogging torque of the stator in FIG. 7.

Next, the principle of cogging torque reduction according to the present invention will be described.

FIG. 8 is a diagram for explaining the cogging torque reduction principle. Ten permanent magnets 9 are placed outside the rotor iron core 8 along the circumferential direction, thereby forming the rotor 3. The magnetization direction of the permanent magnet 9 is opposite between the adjacent permanent magnets 9. The inner radius of the stator iron core 4 present outside the rotor 3 is denoted by r(θ). Here, the diagram is a schematic one in which a slot opening and the like are omitted for simplification. In addition, θ denotes an angular position in a coordinate system fixed on the stator 2. FIG. 8 shows the state where the inner radius r(θ) of the stator iron core 4 varies at three positions indicated by P1, P2, and P3, that is, the state where the permeance at the air gap portion of the permanent magnet motor varies at P1, P2, and P3. The angular positions of P1, P2, and P3 are located at regular intervals of 120°.

In the case of such an inner radius r(θ) of the stator iron core 4, what cogging torque occurs will be described. Cogging torque Tc(ξ) occurring on the rotor 3 can be considered to be the sum of cogging torque T1(ξ) caused by variation in permeance at P1, cogging torque T2(ξ) caused by variation in permeance at P2, and cogging torque T3(ξ) caused by variation in permeance at P3. That is, the following relationship is obtained.

$$Tc(\xi)=T1(\xi)+T2(\xi)+T3(\xi)$$

Here, ξ denotes the rotational angle of the rotor.

Next, it will be assumed that variations in permeance at P1, P2, and P3 are equivalent. If variations in permeance at P1, P2, and P3 are equivalent, the waveforms of the cogging torques T1(ξ) T2(ξ) and T3(ξ) are the same and the phases thereof are different. In addition, this waveform pulses a number of times equal to the pole number of the permanent magnet motor, per one rotation of the rotor. This is because, while the rotor 3 rotates once, the permanent magnet 9 passes by the permeance variation portions (P1, P2, and P3) a number of times just equal to the pole number. For simplifying this, in the case of standardizing cogging torque, cogging torque caused by variation in permeance at P1 can be represented as follows, in light of the fact that the pole number of the permanent magnet motor is 10.

$$T1(\xi)=\sin(10\xi)$$

In addition, cogging torques caused by variations in permeance at P2 and P3 can be represented as follows, by using T1, considering that the phases thereof are shifted.

$$T2(\xi)=T1(\xi-120°)=\sin(10\xi-1200°)=\sin(10\xi-120°)$$

$$T3(\xi)=T1(\xi-240°)=\sin(10\xi-2400°)=\sin(10\xi-240°)$$

FIG. 9 shows T1(ξ) T2(ξ) and T3(ξ) In FIG. 9, T1(ξ) T2(ξ) and T3(ξ) are represented by three sine waves with the phases thereof being shifted by 120° from each other. As a result, the following expression is obtained.

$$Tc(\xi)=T1(\xi)+T2(\xi)+T3(\xi)=0$$

Thus, the cogging torques are cancelled.

That is, this indicates that, if the inner radius r(θ) is equivalent among the three positions separated at intervals of 120°, even if the inner circumference shape is deviated from an exact circle and becomes a distorted shape, cogging torque whose pulsation number is equal to the pole number does not occur.

In other words, if three values of r(θ), r(θ+120°), and r(θ+240°) are the same or substantially the same when θ can take a value of 0 to 360°/3, even if the inner circumference shape is deviated from an exact circle and becomes a distorted shape, cogging torque whose pulsation number is equal to the pole number hardly occurs.

This can be generalized as follows. N is set at a positive integer, and on a plane perpendicular to the rotary shaft of the rotor, the distance from the rotary shaft center to a point on a surface of the stator iron core facing to the rotor, where the angle from the fitting portion of the partial iron core is θ on the perpendicular plane, is defined as an inner radius r(θ). Then, if N values of r(θ), r(θ+360°/N), . . . , r(θ+(i−1)×360°/N), . . . , r(θ+(N−1)×360°/N) are the same value or substantially the same value when θ can take a value of 0 to 360°/N, even if the inner circumference shape of the stator iron core 4 is deviated from an exact circle and becomes a distorted shape, cogging torque whose pulsation number is equal to the pole number hardly occurs.

Further, this shows that if the absolute value of the difference between any two values of the above values is equal to or smaller than a predetermined value, cogging torque whose pulsation number is equal to the pole number can be drastically suppressed.

However, it should be noted that if N is equal to the pole number of the permanent magnet motor, cogging torque cannot be reduced.

In FIG. 8, the case of intervals of 120° (=360°/3), i.e., N=3 has been shown. Here, the case of N=10 will be described. In the case where cogging torque due to variation in permeance at P1 is represented by T1(ξ)=sin(10ξ), if P2 is at a position separate from P1 by 360°/10=36°, cogging torque due to variation in permeance at P2 is represented as follows.

$$T2(\xi)=T1(\xi-36°)=\sin(10\xi-360°)=T1(\xi)$$

Thus, T2(ξ) coincides with T1(ξ). The same applies to the subsequent values. Then, the following expression is obtained.

$$Tc(\xi)=T1(\xi)+T2(\xi)+ \ldots +T10(\xi)=10\times\sin(10\xi)$$

Thus, cogging torques are not cancelled, but on the contrary, the amplitude increases.

Therefore, in the case where N is equal to the pole number of the permanent magnet motor 1, the cogging torque reduction effect cannot be obtained.

Further, in the case where the pole number of the permanent magnet motor 1 is set at K and m satisfying N=mK (m is an integer) is present, permeance pulsation at the air gap portion of the permanent magnet motor includes the K-th order component, and therefore cogging torque cannot be reduced. Therefore, in order that the K-th order permeance pulsation hardly occurs, a relationship of mN≠K needs to be satisfied with respect to the integer m.

As described above, the permanent magnet motor 1 of embodiment 1 can provide an effect of reducing the K-th order cogging torque in which K is the pole number of the rotor.

The permanent magnet motor 1 includes: the stator 2 having the stator iron core 4 and the armature winding 5 wound on the stator iron core 4; and the rotor 3 having the rotary shaft 7, the rotor iron core 8, and the permanent magnet 9, and a portion of the stator iron core 4 facing to the rotor 3 has a distorted shape as compared to an exact circular shape centered on the rotary shaft 7 of the rotor 3.

Here, the distance from the center of the rotary shaft 7 of the rotor 3 to a point on a surface of the stator iron core 4 facing to the rotor 3, where the angle from the fitting portion 15 of the partial iron core 10 is θ, is defined as an inner radius r(θ) (θ takes a value of 0 to 360°/N). Then, the permanent magnet motor 1 is configured such that the absolute value of the difference between any two values among N values of r(θ), r(θ+360°/N), . . . , r(θ+(i−1)×360°/N), . . . , r(θ+(N−1)×360°/N) defined with respect to a positive integer N is equal to or smaller than a predetermined value, and further, regarding N, the relationship of mN≠K is satisfied with respect to the integer m in the case where the pole number of the rotor 3 is set at K. By such a configuration, the spatial 10-th order component of the permeance pulsation at the gap portion of the permanent magnet motor 1 can be extremely reduced even though the shape (inner circumference shape) of the portion of the stator iron core 4 facing to the rotor 3 is not an exact circle. Therefore, an effect of drastically reducing the 10-th order component of cogging torque can be obtained.

As a specific example, the stator inner circumference shape and cogging torque were deliberated using a permanent magnet motor for an electric power steering apparatus in which the stator outer diameter is 80 mm, the rotor outer diameter is 40 mm, the core length is 60 mm, the air gap length is 0.6 mm, the thickness of the permanent magnet is 2.75 mm, the residual magnetic flux density of the permanent magnet is 1.29 T, and the rated torque is 5 Nm.

The relationship between the circularity of the inner circumference shape and the K-th order component of cogging torque is plotted in FIG. 10. An outlined circle indicates an example of a conventional permanent magnet motor, and a filled circle indicates an example of a permanent magnet motor to which the present invention is applied.

Here, K is the pole number of the permanent magnet motor, and the circularity is the difference between the maximum inner radius and the minimum inner radius. As shown in FIG. 10, there are cases where cogging torque is small even if the circularity is large, and meanwhile, there are cases where cogging torque is large even if the circularity is small. That is, there is no correlation between the circularity and the K-th order component of cogging torque.

Next, on a plane perpendicular to the rotary shaft 7 of the rotor 3, the distance from the center of the rotary shaft 7 of the rotor 3 to a point on a surface of the stator iron core 4 facing to the rotor 3, where the angle from the fitting portion 15 of the partial iron core 10 is θ on the perpendicular plane, is defined as an inner radius r(θ) (θ takes a value of 0 to 360°/N).

Then, N values of r(θ), r(θ+360°/N), . . . , r(θ+(i−1)×360°/N), . . . , r(θ+(N−1)×360°/N) defined with respect to a positive integer N are calculated. Further, the maximum value of the absolute value of the difference between any two values of the N values with respect to θ is calculated, and then the average value of the maximum value with respect to the axial direction height of the stator iron core 4 is calculated. Thus, the correlation with cogging torque is confirmed. Here, the axial direction height of a stator iron core is the thickness of a stator iron core formed by laminating, by means such as swaging, planar magnetic materials such as electromagnetic steel sheets punched by a press mold. In FIG. 10 in embodiment 2 described later, A corresponds to the axial direction height of the stator iron core.

Next, a calculation method for the correlation will be described step by step.

First, in step 1, on a plane perpendicular to the rotary shaft of the motor, the distance from the center of the rotary shaft 7 of the rotor 3 to a point on a surface of the stator iron core 4 facing to the rotor 3, where the angle from the fitting portion 15 of the partial iron core 10 is θ on the perpendicular plane, is defined as an inner radius r(θ) (θ takes a value of 0 to 360°/N). Then, N values of r(θ), r(θ+360°/N), . . . , r(θ+(i−1)×360°/N), . . . , r(θ+(N−1)×360°/N) are defined. Then, the absolute value of the difference between any two values of the above N values is taken.

Next, in step 2, a maximum value Δmax of "the absolute value of the difference between any two values" calculated in the above step 1 is calculated while θ is varied on a surface of the stator iron core 4 facing to the rotor 3, i.e., on a portion other than the slot opening and the vicinity thereof.

Next, in step 3, the steps 1 and 2 are performed while the axial direction height of the stator iron core 4 is varied, whereby the maximum value Δmax at each axial direction height is calculated. Based on a result thereof, an average value ΔM of the maximum value Δmax with respect to the axial direction is calculated.

FIG. 11 shows a result of the calculation of the relationship between ΔM and the K-th order component of cogging torque obtained through the above steps. Unlike FIG. 10, there is a correlation between ΔM and the K-th order component of cogging torque, in which the K-th order component of cogging torque tends to increase as ΔM increases.

In an electric power steering apparatus, if the cogging torque of the motor is set to be equal to or smaller than 15 mNm, a preferable steering feeling can be obtained, and at the same time, an electric power steering apparatus with small vibration noise can be obtained.

Therefore, if ΔM is set to be equal to or smaller than 20 μm, the K-th order component of cogging torque can be made equal to or smaller than 15 mNm, whereby the above-described effect can be obtained more prominently.

Here, the reason that ΔM is the average value with respect to the axial direction will be described. It is considered that even if there is locally a portion where distortion of the stator inner circumference shape is large, the influence thereof on cogging torque is generally small as long as such large distortion is only partial. Therefore, if ΔM as the average value is set to be equal to or smaller than 20 μm, cogging torque can be reduced.

Also, with respect to the maximum value r(θ)max and the minimum value r(θ)min among N values of r(θ), r(θ+360°/N), . . . , r(θ+(i−1)×360°/N), . . . , r(θ+(N−1)×360°/N), if the periodic shape difference Δ(θ)=r(θ)max−r(θ)min per 360°/N is set to be equal to or smaller than 20 μm, the same effect as described above can be obtained.

A point different from the conventional case is that cogging torque can be reduced even though the inner circumference shape of the stator iron core 4 is deviated from an exact circle and distorted.

FIGS. 10 and 11 show results of evaluation of the same permanent magnet motor. These results show that even if the circularity is large, that is, the inner circumference shape of the stator iron core 4 is deviated from an exact circle and distorted, an effect of reducing cogging torque is obtained. With regard to a conventional parameter, i.e., the circularity, there is no correlation. However, there is a correlation between the parameter ΔM of the present invention and cogging torque.

This suggests that, a permanent magnet motor with small cogging torque can be obtained, even if the permanent magnet motor is manufactured in a manufacture process that includes a factor, such as welding, of distorting the inner circumference shape of the stator iron core 4 since the inner circumference shape is a shape distorted from an exact circle.

In addition, since the permanent magnet motor 1 according to embodiment 1 has a partial iron core configuration that can be linearly expanded, an effect is obtained that the material yield can be improved, winding is facilitated, and high-density winding is enabled, as compared to the case of using an iron core integrally formed in a circular shape or a partial iron core formed in an arc shape.

Further, since continuous winding can be conducted in a partial iron core state before joining, an effect is obtained that the number of connection points can be reduced and the reliability and the workability at a wire connection portion can be improved as compared to the case of connecting wires after an iron core is joined into a circular tube shape.

In addition, by using the rotary electric machine of the present invention for a motor for driving an electric power steering drive, an effect is obtained that torque pulsation upon steering operation can be reduced, thereby allowing a smooth steering operation.

Thus, the case of the motor in which the stator outer diameter is 80 mm, the rotor outer diameter is 40 mm, the core length is 60 mm, the air gap length is 0.6 mm, the thickness of the permanent magnet is 2.75 mm, the residual magnetic flux density of the permanent magnet is 1.29 T, and the rated torque is 5 Nm, has been described. However, the present invention is also applicable to cases other than the above case. Then, the above case will be generalized as follows.

It has been described that cogging torque has a correlation with the parameter ΔM of the present invention, and from FIG. 11, it has been found that the K-th order component of cogging torque tends to increase as ΔM increases.

In the case of FIG. 11, cogging torque can be reduced by setting ΔM to be equal to or smaller than 20 μm. However, depending on the design of the motor, the value of ΔM varies. The K-th order component of cogging torque can be considered to increase as an air gap magnetic flux density B(T) of the motor increases, and to be proportional to the magnitude of magnetic energy stored in the air gap.

Since the magnetic energy is proportional to the square of the magnetic flux density, it is considered that the K-th order component of cogging torque is proportional to the square of the air gap magnetic flux density. Therefore, generally, it is considered that the K-th order component of cogging torque is proportional to the product of ΔM and the square of the air gap magnetic flux density.

Meanwhile, the air gap magnetic flux density B of the motor can be approximated by the following expression.

[Expression 1]

$$B = \frac{\frac{Lm}{\mu r}}{\frac{Lm}{\mu r} + g} Br \tag{1}$$

Here, Lm is the thickness (m) of the permanent magnet, μr is a recoil permeability, g is an air gap length (m), and Br is the residual magnetic flux density (T) of the permanent magnet.

FIG. 13 is a diagram for explaining the thickness of the permanent magnet and the air gap length. Here, the thickness of the permanent magnet refers to the maximum thickness as shown in FIG. 13. Accordingly, the following value which is the product of ΔM and the square of the air gap magnetic flux density B is defined as a parameter indicating the magnitude of the K-th order component of cogging torque.

[Expression 2]

$$\frac{\Delta M\left(\frac{Lm}{\mu r}\right)^2 Br^2}{\left(\frac{Lm}{\mu r} + g\right)^2} \tag{2}$$

The unit of this value is $mT^2$ (meter×tesla$^2$).

If this value is set to be equal to or smaller than a predetermined value, the K-th order component of cogging torque can be reduced regardless of the design of the motor. Further, if this parameter is set to be equal to or smaller than a predetermined value, even if the outer shape of the motor is changed from the shape shown above as an example in which the stator outer diameter is 80 mm, the rotor outer diameter is 40 mm, and the core length is 60 mm, the ratio between the K-th order component of cogging torque and the rated torque can be suppressed to be the same value of 0.015 Nm/5 Nm=0.3%. Thus, an effect of suppressing cogging torque to an extremely small level is obtained.

FIG. 12 is a diagram corresponding to FIG. 11 in which the horizontal axis is replaced with the above parameter and the ratio of the K-th order component of cogging torque to the rated torque is indicated by a percent value on the vertical axis. Therefore, if the parameter shown by expression (2) is set to be equal to or smaller than $2.2\times10^{-5}$ ($mT^2$), an effect is obtained that the K-th order component of cogging torque can be reduced to only 0.3% or less of the rated torque.

In addition, a parameter represented by the following expression (3) is defined.

[Expression 3]

$$\frac{\angle(\theta)\left(\frac{Lm}{\mu r}\right)^2 Br^2}{\left(\frac{Lm}{\mu r}+g\right)^2} \tag{3}$$

If this value is set to be equal to or smaller than a predetermined value, the K-th order component of cogging torque can be reduced regardless of the motor design.

Specifically, if this value is set to be equal to or smaller than $2.2\times10^{-5}$ ($mT^2$), an effect is obtained that the K-th order component of cogging torque can be reduced to only 0.3% or less of the rated torque.

As described above, in the permanent magnet motor of embodiment 1, generally, where the pole number of the rotor is K and the slot number of the stator is L, if mN≠K is satisfied with respect to an integer m and the number of teeth included in each divided iron core is set at L/N=n (n is an integer), the order of the permeance pulsation occurring at the tooth and the slot coincides with an integral multiple of permeance pulsation due to variation in the stator inner circumference shape, whereby the spatial K-th order component in permeance pulsation at the gap portion of the permanent magnet motor can be further reduced. Therefore, an effect is obtained that the K-th order component of cogging torque can be further reduced.

In addition, in a permanent magnet motor having a divided iron core in which the above value N is set at the smallest value among integers satisfying the relationship of mN≠K with respect to the integer m and satisfying the relationship of L/N=n (n is an integer), the division number for dividing a stator to form periodic distortion of the inner circumference can be suppressed to the minimum, whereby an effect of reducing the number of assembly processes is obtained.

Further, in the conventional permanent magnet motor with 10 poles and 12 slots, the winding coefficient of a fundamental wave is larger than in the case of 6 poles and 9 slots or 12 poles and 9 slots. Therefore, the usage amount of the permanent magnets can be reduced, whereby the cost of the motor can be reduced. In addition, the winding coefficient of a harmonic wave is smaller than in the case of 6 poles and 9 slots or 12 poles and 9 slots. Therefore, torque ripple can be reduced, whereby reduction in vibration and noise of an electric power steering apparatus can be realized.

Meanwhile, there is a problem that cogging torque is likely to increase due to distortion of the inner circumference shape of the stator iron core and that there is great variation among motors. Particularly, such a problem is serious in the case of using a motor for electric power steering.

However, the permanent magnet motor with 10 poles and 12 slots of embodiment 1 of the present invention can solve such problems, suppress the division number to the minimum, and reduce the number of assembly processes. Therefore, an effect is obtained that reduction in the cost, vibration, and noise, and reduction in cogging torque can be both realized.

Embodiment 2

Figure 14:
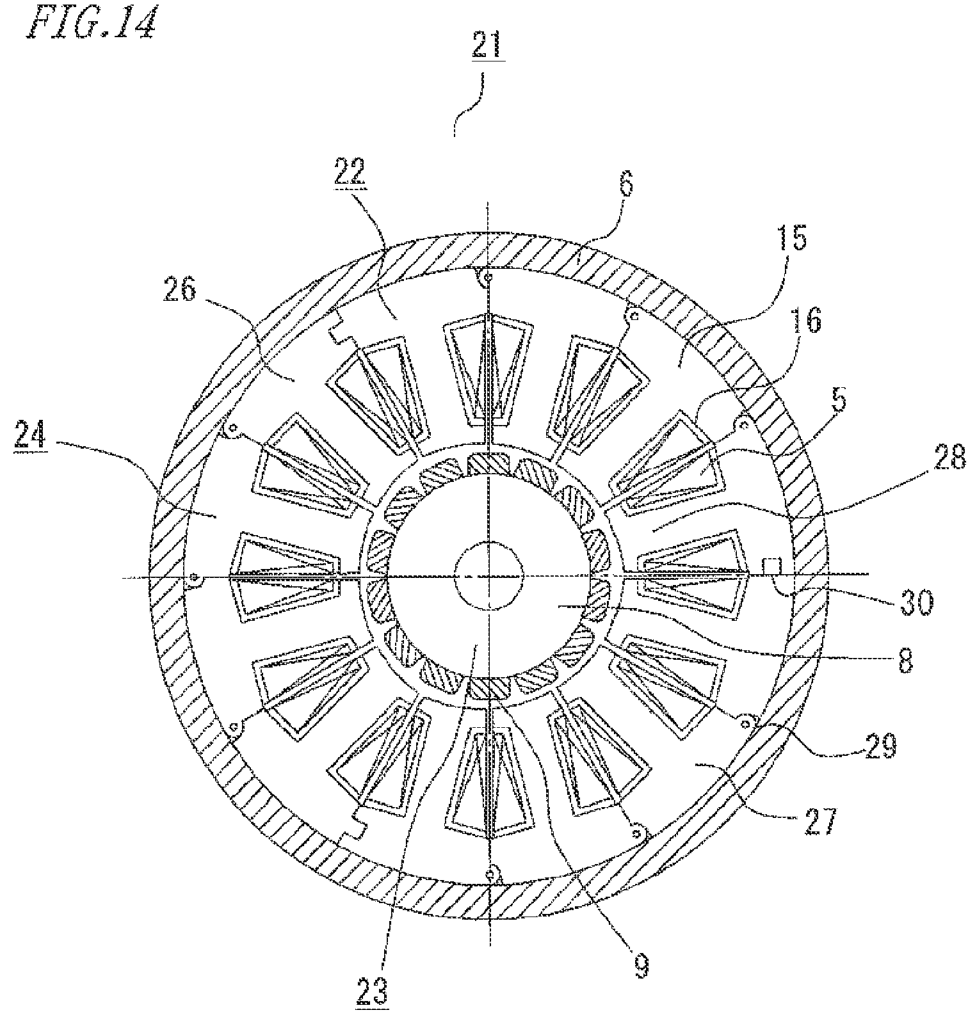
FIG. 14 is a sectional view according to a permanent magnet motor of embodiment 2 of the present invention.
Figure 15:
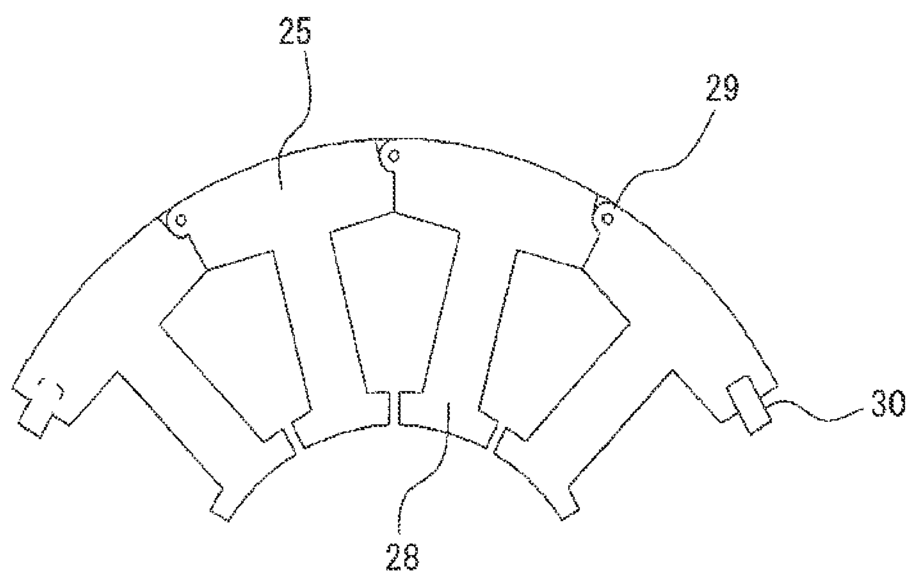
FIG. 15 is a plane view of the stator before assembly according to the permanent magnet motor of embodiment 2 of the present invention.
Figure 16:
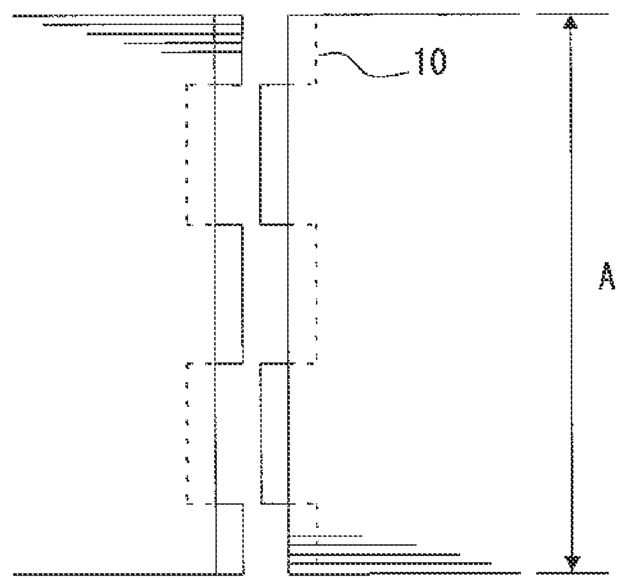
FIG. 16 is a side view of a fitting portion according to the permanent magnet motor of embodiment 2 of the present invention.
Figure 17:
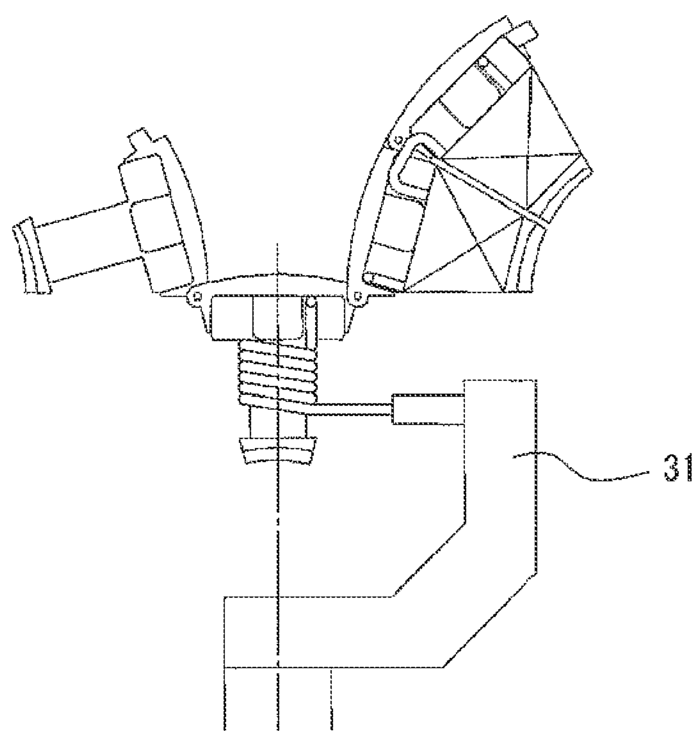
FIG. 17 is a plane view of a partial iron core upon winding according to the permanent magnet motor of embodiment 2 of the present invention.
Figure 18:
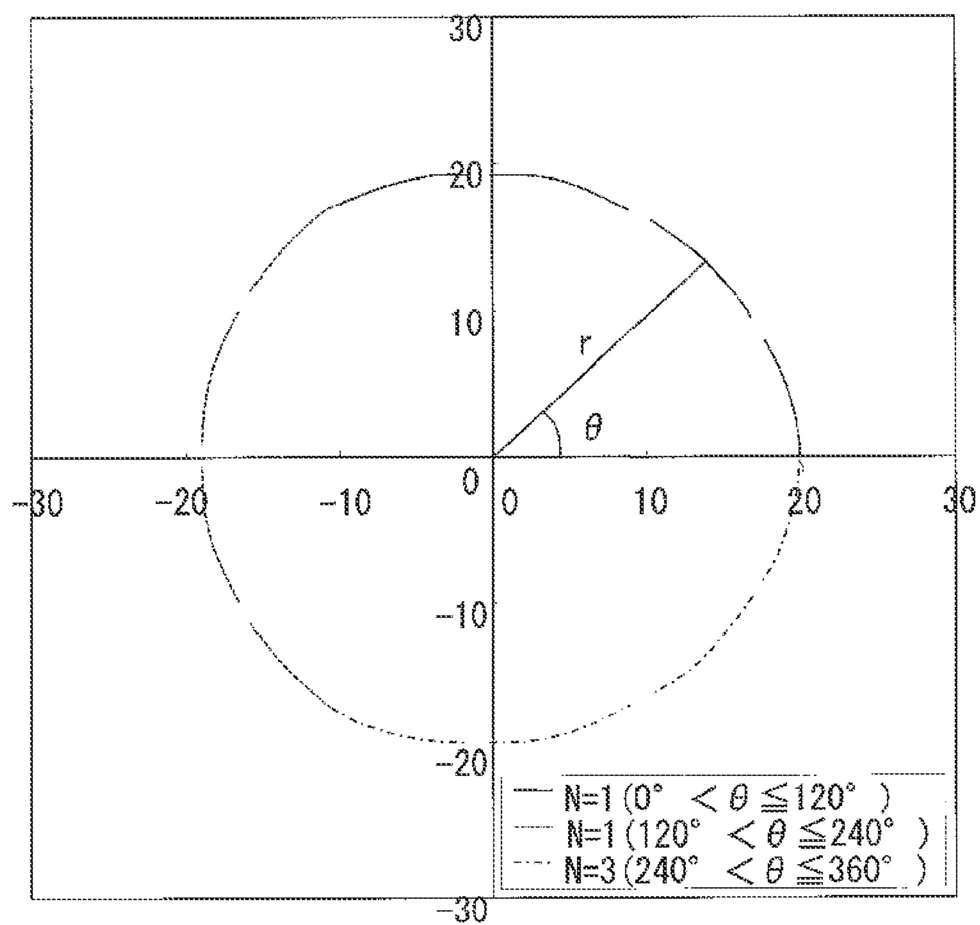
FIG. 18 is a schematic diagram of a stator inner circumference shape according to the permanent magnet motor of embodiment 2 of the present invention.
Figure 19:
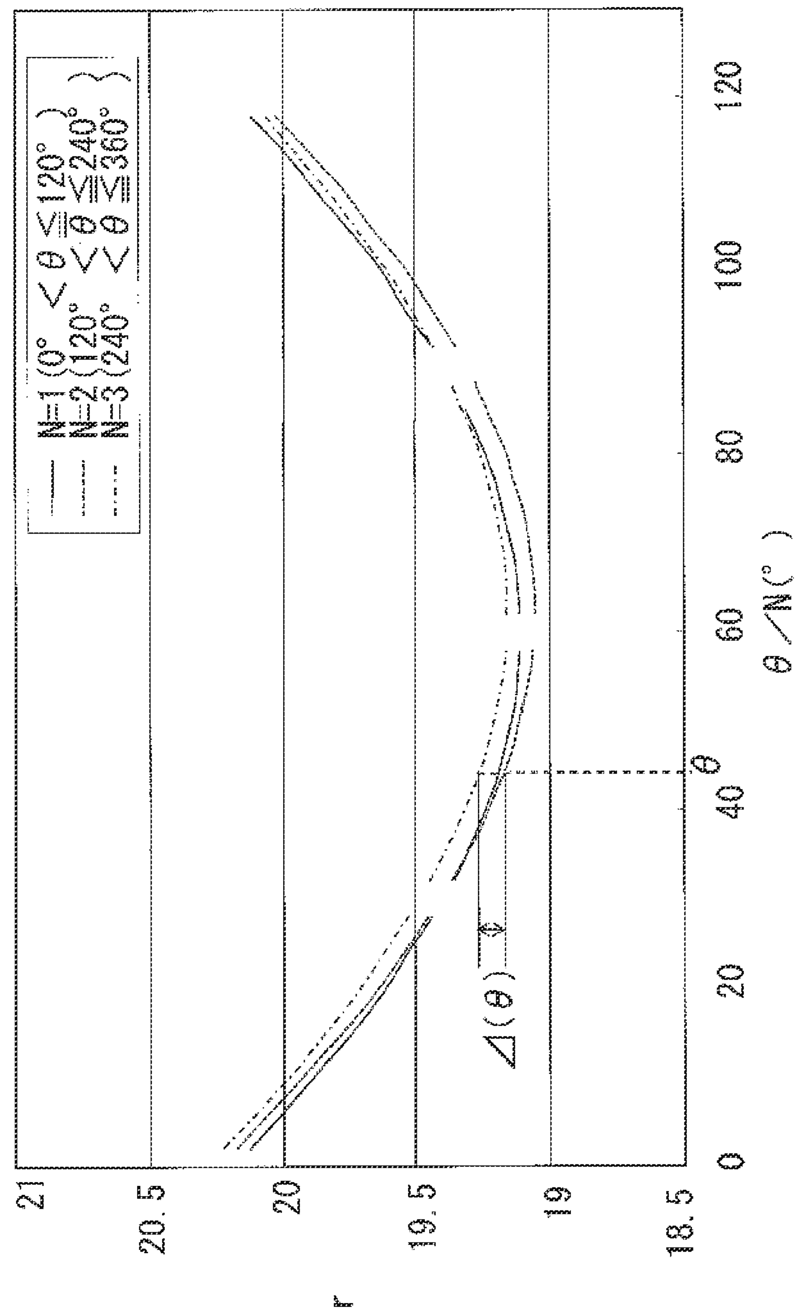
FIG. 19 is a schematic diagram of a stator inner circumference shape according to the permanent magnet motor of embodiment 2 of the present invention.

Hereinafter, embodiment 2 of the present invention will be described based on the drawings. FIG. 14 is a sectional view of a permanent magnet motor 21 according to embodiment 2 of the present invention. FIG. 15 is a plane view of the stator before assembly. FIG. 16 is a side view of a fitting portion. FIG. 17 is a plane view of a partial iron core upon winding. FIGS. 18 and 19 are schematic diagrams of the inner circumference shape. In FIG. 14, components that are the same as or correspond to those in FIG. 1 are denoted by the same reference numerals.

The configuration and the function of the permanent magnet motor 21 according to embodiment 2 of the present invention will be described based on FIGS. 14 to 19.

In FIG. 14, the permanent magnet motor 21 is composed of a stator 22 and a rotor 23. The rotor 23 has 14 poles, and the stator 22 has 12 slots.

The stator 22 is composed of a stator iron core 24, an armature winding 5, a yoke 6, partial iron cores 25, 26, and 27, a tooth 28, a joint portion 29, a fitting portion 30, and a bobbin 16. The rotor 23 is composed of a rotary shaft 7, a rotor iron core 8, and a permanent magnet 9.

The stator iron core 24 is formed by laminating, by means such as swaging, planar magnetic materials such as electromagnetic steel sheets punched into an arc shape by a press mold, and the partial iron cores 25, 26, and 27 are punched by the same mold. In addition, the partial iron cores 25, 26, and 27 are each composed of four teeth 28 joined in a rotatable fashion at outer circumferential portions by means such as swaging (see FIG. 15). Each partial iron core is punched by a mold and laminated, the bobbin 16 is attached and wound with a wire, and then the partial iron core is rotated at the joint portion 29, to be formed in an arc shape.

The partial iron cores 25, 26, and 27 have concave and convex fitting portions 30 at their end portions, which are provided alternately in the lamination direction, so that they can be pressed into each other, with interferences $\delta_0$ provided therebetween (see FIG. 16).

Upon winding, the partial iron core is rotated at the joint portion so that the winding portion for the armature winding 5 is widely exposed, and then winding is conducted by a winding mechanism such as a flyer winding machine 31 (see FIG. 17). After the winding, the partial iron cores 25, 26, and 27 are returned to an arc shape, and then formed in a circular tube shape by fitting the fitting portions 30 at their end portions into each other. Thereafter, the outer circumference of the fitting portion is fixed by welding, and then connection of a winding conductive wire terminal of the armature winding 5, and press fit to the yoke 6, are conducted. Thus, the stator 22 is formed.

In the stator 22 configured as described above, since the partial iron cores 25, 26, and 27 punched into an arch shape by the same press mold are each placed by an angle of 120 degrees, the inner circumference shape is closer to an exact circle than in the case of the partial iron cores 10, 11, and 12 of embodiment 1 which are punched into a linear shape. In addition, since the partial iron cores 25, 26, and 27 are punched by the same mold, substantially the same inner circumference dimension is obtained per 120° (see FIG. 18). In addition, since the fitting among the partial iron cores 25, 26, and 27 is conducted by press fit, the radial difference in the inner radial direction at the butting portions among the partial iron cores 25, 26, and 27 appears in a substantially equal amount per 120° (see FIG. 19). Therefore, an effect is obtained that the periodic inner circumference shape can be easily formed and high productivity can be obtained as compared to cutting work or the like.

Owing to the above configuration, in the permanent magnet motor 21 of embodiment 2, the periodic shape difference $\Delta(\theta)=r(\theta)max-r(\theta)min$ per $360°/N=120°$ with respect to the maximum value $r(\theta)max$ and the minimum value $r(\theta)min$ among $r(\theta)$, $r(\theta+360°/3)=r(\theta+120°)$, and $r(\theta+2*360°/3)=r(\theta+240°)$ when $\theta$ takes a value of 0 to 360°/3, can be suppressed to be smaller than in embodiment 1, whereby an effect is obtained that the 14-th order component of cogging torque can be more reduced.

Further, by providing the fitting portions 30 alternately in the lamination direction, positional displacement in the lamination direction can be suppressed, and therefore permeance pulsation at the gap portion of the motor due to the lamination direction displacement of the fitting portions 30 can be reduced, whereby an effect of suppressing cogging torque is obtained.

In addition, since the partial iron cores 25, 26, and 27 are joined in a rotatable fashion at outer circumferential portions thereof, an effect is obtained that, even though they are punched into an arc shape, high-speed and high-density winding can be conducted by widely exposing a tooth winding portion upon winding.

Further, in the conventional permanent magnet motor with 14 poles and 12 slots, the winding coefficient of a fundamental wave is larger than in the case of 6 poles and 9 slots or 12 poles and 9 slots. Therefore, the usage amount of the permanent magnets can be reduced, whereby the cost of the motor can be reduced. In addition, the winding coefficient of a harmonic wave is smaller than in the case of 6 poles and 9 slots or 12 poles and 9 slots. Therefore, torque ripple can be reduced, whereby reduction in vibration and noise of an electric power steering apparatus can be realized.

Meanwhile, there is a problem that cogging torque is likely to increase due to distortion of the inner circumference shape of the stator iron core and that there is great variation among motors. Particularly, such a problem is serious in the case of using a motor for electric power steering.

However, the permanent magnet motor with 14 poles and 12 slots of embodiment 1 of the present invention can solve such problems, suppress the division number to the minimum, and reduce the number of assembly processes. Therefore, an effect is obtained that reduction in the cost, vibration, and noise, and reduction in cogging torque can be both realized.

Embodiment 3

Figure 20:
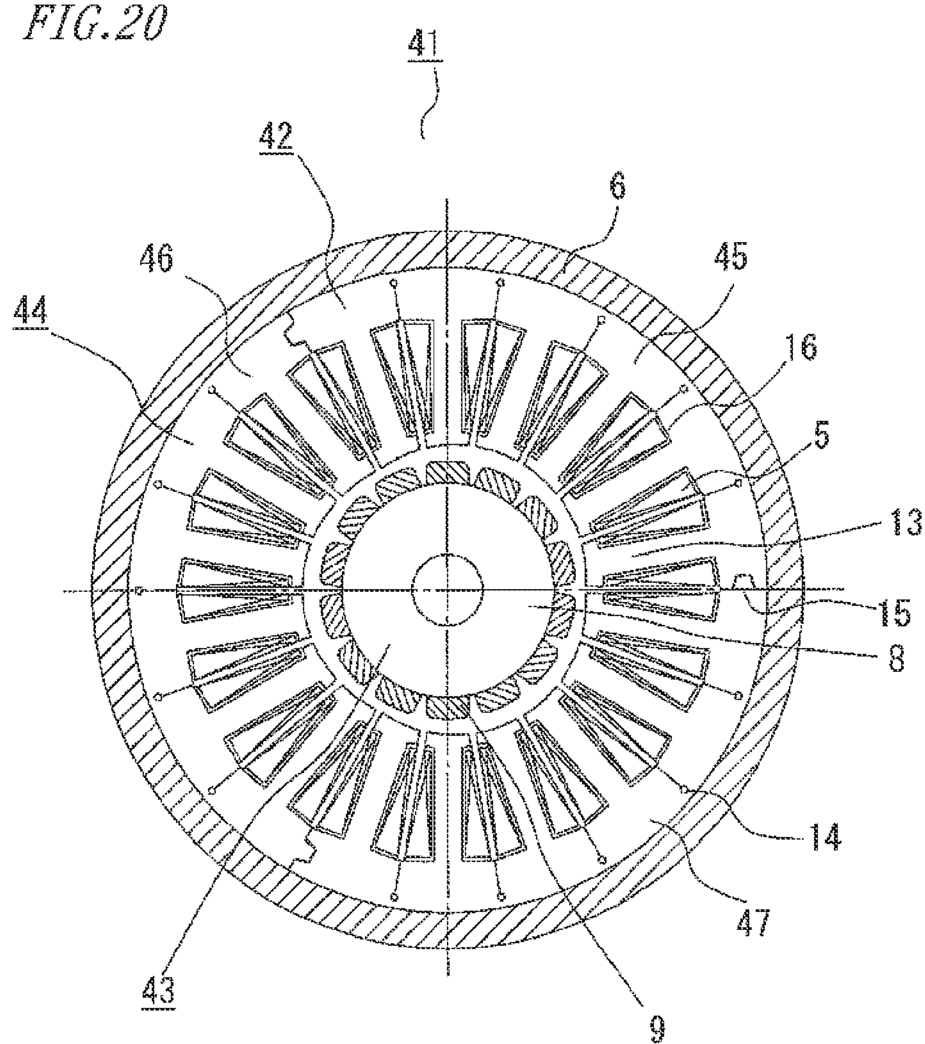
FIG. 20 is a sectional view according to a permanent magnet motor of embodiment 3 of the present invention.
Figure 21:
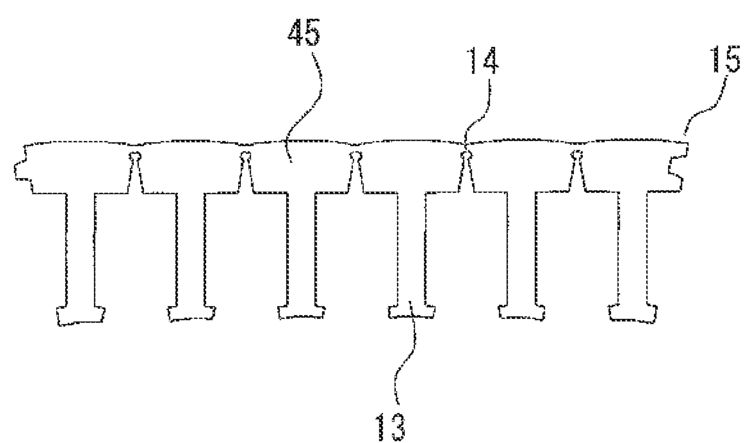
FIG. 21 is a plane view of a partial iron core before assembly according to the permanent magnet motor of embodiment 3 of the present invention.
Figure 22:
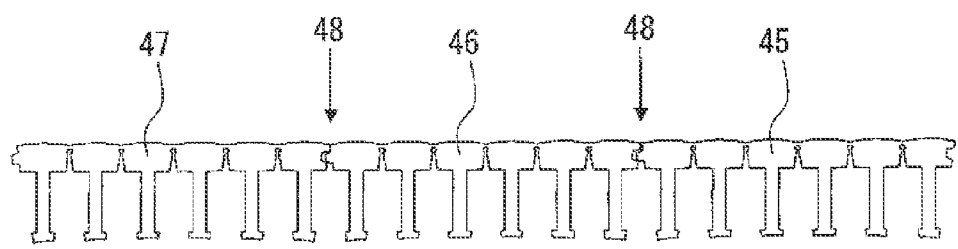
FIG. 22 is a plane view of a partial iron core in the middle of assembly according to the permanent magnet motor of embodiment 3 of the present invention.
Figure 23:
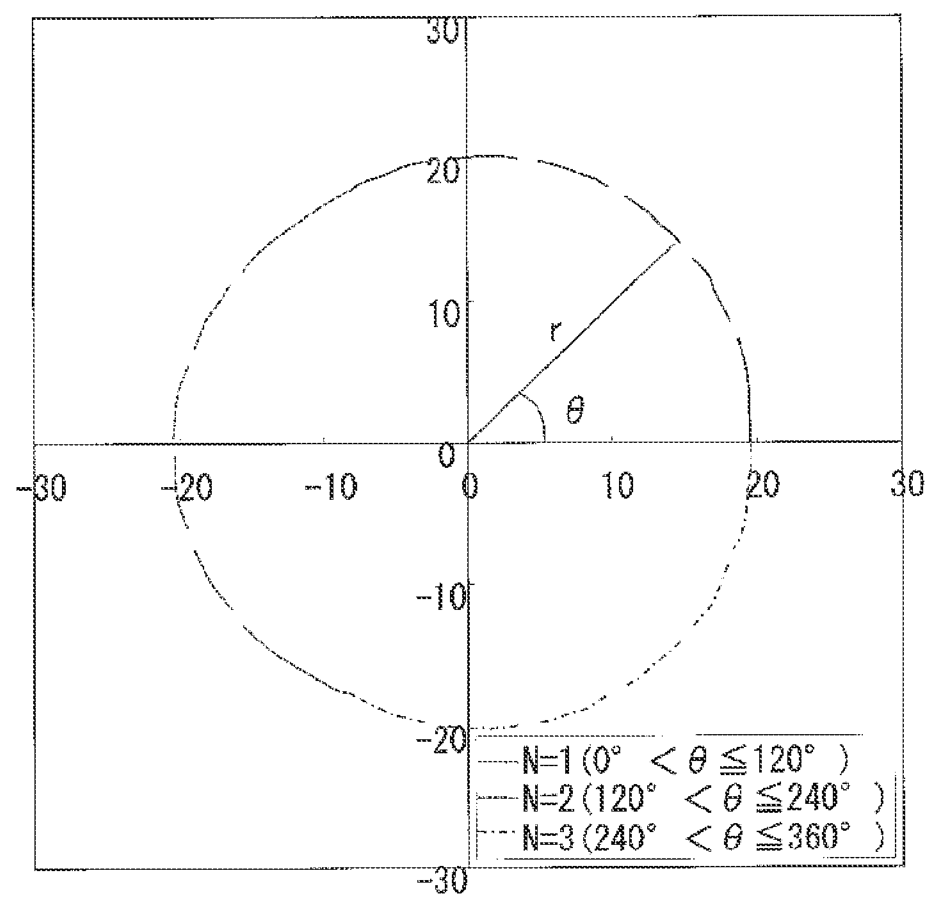
FIG. 23 is a schematic diagram of a stator inner circumference shape according to the permanent magnet motor of embodiment 3 of the present invention.
Figure 24:
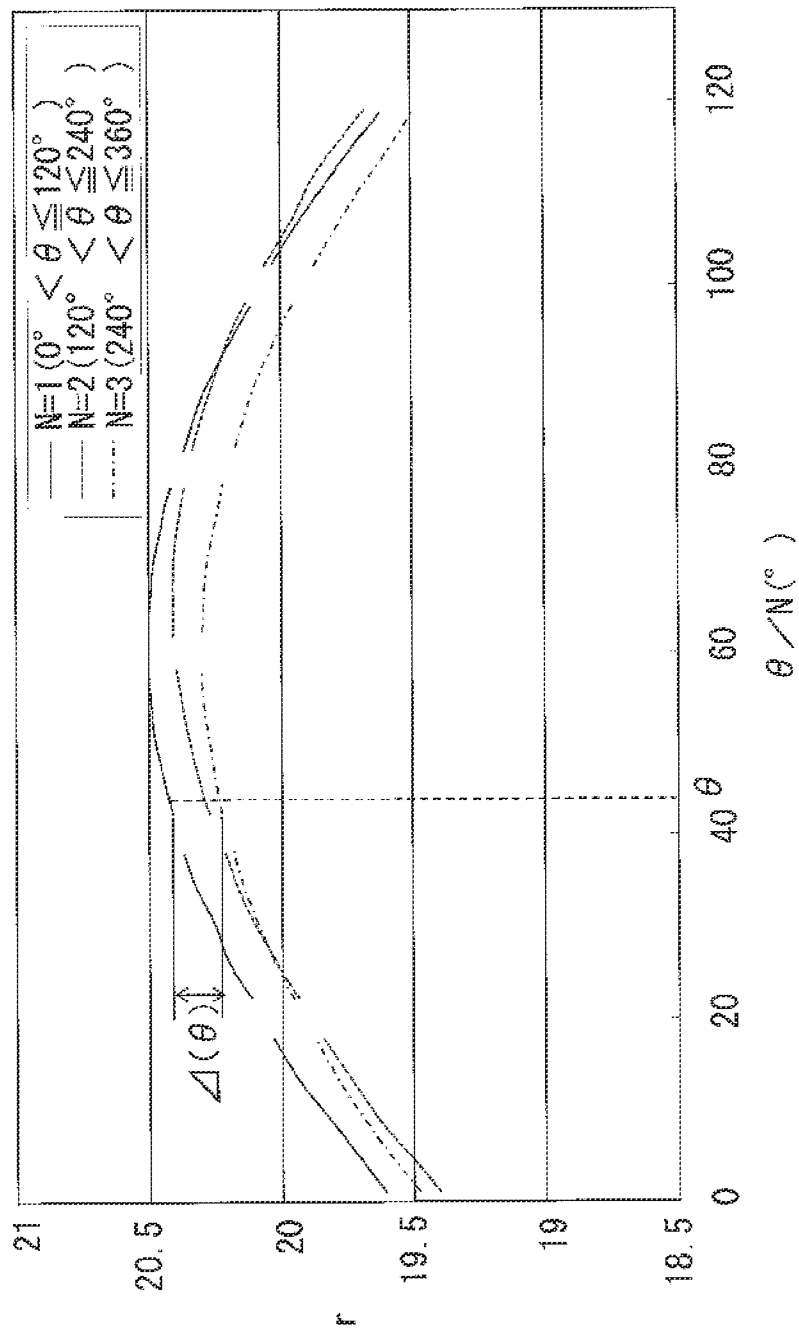
FIG. 24 is a schematic diagram of a stator inner circumference shape according to the permanent magnet motor of embodiment 3 of the present invention.
Figure 25:
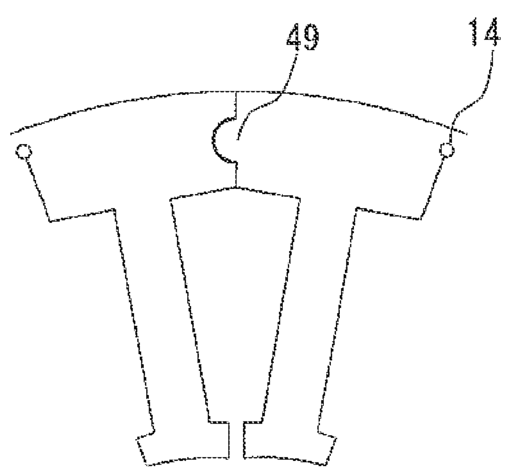
FIG. 25 is a fitting portion diagram of a partial iron core end portion according to the permanent magnet motor of embodiment 3 of the present invention.

Hereinafter, embodiment 3 of the present invention will be described based on the drawings. FIG. 20 is a sectional view of a permanent magnet motor 41 according to embodiment 3 of the present invention. FIG. 21 is a plane view of the stator before assembly. FIG. 22 is a plane view of the stator in the middle of assembly. FIGS. 23 and 24 are schematic diagrams of the inner circumference shape. FIG. 25 is a fitting portion diagram of partial iron core end portions. In FIG. 20, components that are the same as or correspond to those in FIG. 1 are denoted by the same reference numerals.

The configuration and the function of the permanent magnet motor 41 according to embodiment 3 of the present invention will be described based on FIGS. 20 to 25.

In FIG. 20, the permanent magnet motor 41 is composed of a stator 42 and a rotor 43. The rotor 43 has 14 poles, and the stator 42 has 18 slots.

The stator 42 is composed of a stator iron core 44, an armature winding 5, a yoke 6, partial iron cores 45, 46, and 47, a tooth 13, a thin body portion 14, a fitting portion 15, and a bobbin 16. The rotor 43 is composed of a rotary shaft 7, a rotor iron core 8, and a permanent magnet 9.

The stator iron core 44 is formed by laminating, by means such as swaging, planar magnetic materials such as electromagnetic steel sheets punched by a press mold, and the partial iron cores 45, 46, and 47 are punched by the same mold. The partial iron cores 45, 46, and 47 have trapezoidal fitting portions 15 at their end portions so that they can be fitted into each other, with clearances $\delta_A$ provided in the radial direction.

In addition, the partial iron cores 45, 46, and 47 are each composed of six teeth 13 joined at the thin body portion 14 on the outer circumference. Each partial iron core is punched by a mold and laminated in a state shown in FIG. 21. The partial iron cores 45, 46, and 47 are arranged in series as shown in FIG. 22, and butting portion outer circumferential sides 48 among the iron cores are connected by welding. Next, the bobbin 16 is attached and wound with a wire, and then the iron cores are bent at the thin body portions 14 and the two welding portions. Next, in the state where the partial iron cores are closed as a whole, the partial iron cores 45 and 47 are connected to each other by welding their outer circumferential sides.

Thereafter, connection of a winding conductive wire terminal of the armature winding 5, and press fit to the yoke 6, are conducted. Thus, the stator 42 is formed.

In the stator 42 configured as described above, since the partial iron cores 45, 46, and 47 are connected in a linearly expanded state, the positions of the partial iron cores 45, 46, and 47 on the inner circumferential side can be regulated on the same plane. Therefore, radial direction displacement among the partial iron cores 45, 46, and 47 after bending can be suppressed (see FIG. 22).

Further, owing to the trapezoidal fitting portions 15 provided at the end portions of the partial iron cores 45, 46, and 47, radial direction positional displacement can be suppressed to be equal to or smaller than $\delta_A$ at a maximum and at the same time, the partial iron cores can be bent even after arranged in series.

Owing to the above configuration, in the permanent magnet motor 41 of embodiment 3, since radial direction displacement among the partial iron cores 45, 46, and 47 can be suppressed, the periodic shape difference $\Delta(\theta)=r(\theta)max-r(\theta)min$ per $360°/N=120°$ with respect to the maximum value $r(\theta)max$ and the minimum value $r(\theta)min$ among $r(\theta)$, $r(\theta+360°/3)=r(\theta+120°)$, and $r(\theta+2*360°/3)=r(\theta+240°)$ when $\theta$ takes a value of 0 to 360°/3, can be suppressed to be smaller than in embodiment 1, whereby an effect is obtained that the 14-th order component of cogging torque can be more reduced.

In addition, since the partial iron cores 45, 46, and 47 are integrated before windings and the like, work, conveyance, and the like conducted thereafter are facilitated, whereby an effect of improving workability is obtained.

Further, since the partial iron cores can be linearly expanded via the joint portions, an effect is obtained that the material yield can be improved and winding can be conducted with ease and high density, as compared to an arc-shaped partial iron core.

It is noted that as shown in FIG. 25, the partial iron cores 45, 46, and 47 may have semicircle fitting portions 49 at their end portions so that they can be fitted into each other, with clearances $\delta_A$ provided in the radial direction. Also in this case, the same effect is obtained, and further, an effect of improving work accuracy is obtained because the mold shape is simple.

Further, in the conventional permanent magnet motor with 14 poles and 18 slots, the winding coefficient of a fundamental wave is larger than in the case of 6 poles and 9 slots or 12 poles and 9 slots. Therefore, the usage amount of the permanent magnets can be reduced, whereby the cost of the motor can be reduced. In addition, the winding coefficient of a harmonic wave is smaller than in the case of 6 poles and 9 slots or 12 poles and 9 slots. Therefore, torque ripple can be reduced, whereby reduction in vibration and noise of an electric power steering apparatus can be realized.

Meanwhile, there is a problem that cogging torque is likely to increase due to distortion of the inner circumference shape of the stator iron core and that there is great variation among motors. Particularly, such a problem is serious in the case of using a motor for electric power steering.

However, the permanent magnet motor with 14 poles and 18 slots of embodiment 3 of the present invention can solve such problems, suppress the division number to the minimum, and reduce the number of assembly processes. Therefore, an effect is obtained that reduction in the cost, vibration, and noise, and reduction in cogging torque can be both realized.

Embodiment 4

Figure 26:
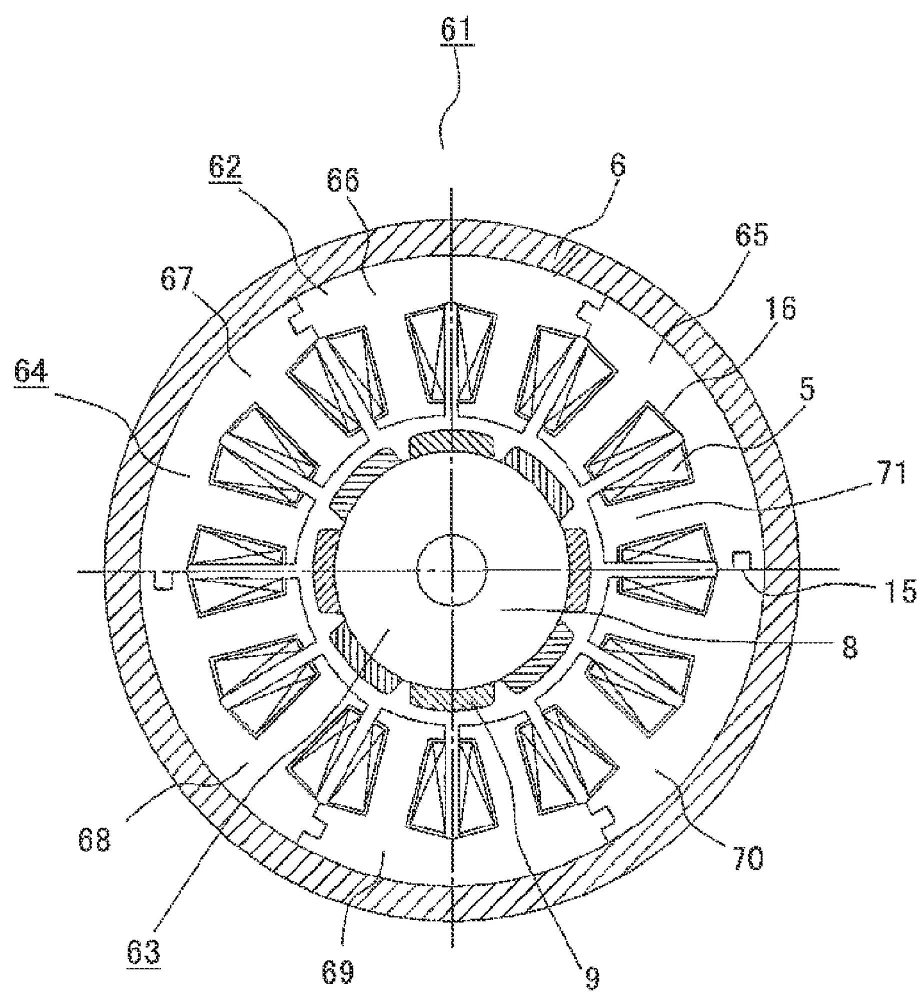
FIG. 26 is a sectional view according to a permanent magnet motor of embodiment 4 of the present invention.
Figure 27:
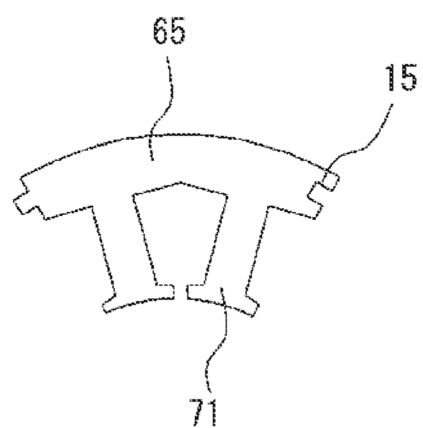
FIG. 27 is a plane view of a partial iron core before assembly according to the permanent magnet motor of embodiment 4 of the present invention.

Hereinafter, embodiment 4 of the present invention will be described based on the drawings. FIG. 26 is a sectional view of a permanent magnet motor 61 according to embodiment 4 of the present invention. FIG. 27 is a plane view of the stator before assembly. In FIG. 26, components that are the same as or correspond to those in FIG. 1 are denoted by the same reference numerals.

The configuration and the function of the permanent magnet motor 61 according to embodiment 4 of the present invention will be described based on FIGS. 26 and 27.

In FIG. 26, the permanent magnet motor 61 is composed of a stator 62 and a rotor 63. The rotor 63 has 8 poles, and the stator 62 has 12 slots.

The stator 62 is composed of a stator iron core 64, an armature winding 5, a yoke 6, partial iron cores 65 to 70, a tooth 71, a fitting portion 15, and a bobbin 16. The rotor 63 is composed of a rotary shaft 7, a rotor iron core 8, and a permanent magnet 9.

The stator iron core 64 is formed by laminating, by means such as swaging, planar magnetic materials such as electromagnetic steel sheets punched by a press mold, and the partial iron cores 65 to 70 are punched by the same mold. In addition, the partial iron cores 65 to 70 are each composed of two teeth 71. Each partial iron core is punched by a mold and laminated in a state shown in FIG. 27, and then the bobbin 16 is attached and wound with a wire. The partial iron cores 65 to 70 have concave and convex fitting portions 15 at their end portions so that they can be pressed into each other, with interferences $\delta_0$ provided in the radial direction. After winding, the partial iron cores 65 to 70 are formed in a circular tube shape by pressing the fitting portions 15 at their end portions into each other. Then, connection of a winding conductive wire terminal of the armature winding 5, and press fit to the yoke, are conducted. Thus, the stator 62 is formed.

In the stator 62 configured as described above, since the partial iron cores 65 to 70 are each composed of only two joined teeth, the size of a press mold for iron core punching can be reduced. Therefore, an effect is obtained that variation in the lamination thickness in each partial iron core can be more suppressed than in the case of a partial iron core composed of a longer series of joined teeth. In addition, the sizes of a press work machine and a mold can be reduced and the press speed can be increased. Therefore, an effect of suppressing the cost of the facility and the mold for small-amount production or the like is obtained.

Owing to the above configuration, in the permanent magnet motor 61 of embodiment 4, the periodic shape difference $\Delta(\theta)=r(\theta)max-r(\theta)min$ per $360°/N=60°$ with respect to the maximum value $r(\theta)max$ and the minimum value $r(\theta)min$ among $r(\theta)$, $r(\theta+360°/6)=r(\theta+60°)$, $r(\theta+2*360°/6)=r(\theta+120°)$, . . . , $r(\theta+5*360°/6)=r(\theta+300°)$ when $\theta$ takes a value of 0 to 360°/6, can be suppressed to be smaller than in embodiment 1, whereby an effect is obtained that the 10-th order component of cogging torque can be more reduced.

In addition, the partial iron cores 65 to 70 are connected by only press fit of the fitting portions without welding or the like. Therefore, an effect is obtained that the circular tube shape can be formed by the fitting portion shape and press fit of the yoke without being influenced by the fixture shape or the fixing method for connection work such as welding.

It is noted that although not shown, similarly, an effect of suppressing a component of cogging torque whose order number is proportional to the stator pole number is obtained at N=4 in the case where the rotor has 10 poles and the stator has 12 slots, at N=4 or 6 in the case where the rotor has 14 poles and the stator has 12 slots, at N=6 or 9 in the case where the rotor has 14 poles and the stator has 18 slots, for example.

Embodiment 5

Hereinafter, embodiment 5 of the present invention will be described.

Generally, at a fitting portion, a thin body portion, and a joint portion of a partial iron core, distortion in the difference among the radial direction distances from a rotary shaft center of a rotor to the stator inner circumference is likely to occur. However, at the thin body portion and the joint portion of the partial iron core, as described in embodiment 1, even if the inner circumference shape of the stator iron core is deviated from an exact circle and distorted, the K-th order cogging torque relating to the pole number K of the rotor can be reduced by periodically causing the distortion. However, it is difficult to solve distortion at the fitting portion of the partial iron core by only applying the invention of embodiment 1.

Specifically, a is set as an angle sufficiently smaller than 360°/L and larger than the angle of the slot opening width, and i=1 to N (N is an integer that is the number of partial iron cores) is set. Then, the difference between the radial direction distances from the rotary shaft center of the rotor to the stator inner circumference, on both sides of the joint portion of the partial iron core, is defined as follows.

$$\delta(i)=r((i-1)\times 360°/N-\alpha)-r((i-1)\times 360°/N+\alpha)$$

In this case, a problem arises that, if a maximum value δmax of the absolute value of the difference between any two values of N values of δ(i) with respect to i=1 to N is large, the inner circumference shape of the stator iron core is distorted, whereby cogging torque increases.

In response, by modifying the fitting portion of the joint portion of the partial iron core, it becomes possible to reduce the absolute value of the difference between any two values of δ(i) with respect to i=1 to N.

For example, if H and h in FIG. 3 are set so as to reduce $\delta_A$=H−h, the stator radial direction position can be regulated without using a fixture or the like, whereby an effect that assembly performance can be improved is obtained. Specifically, if $\delta_A$=H−h≤20 μm is set, an effect substantially equal to the effect of reducing the K-th order component of cogging torque described in embodiment 1 can be obtained.

That is, for example, in the permanent magnet motor having three partial iron cores in which the rotor has 8 poles and the stator has 12 slots described in FIG. 1 in embodiment 1, if the absolute value of the difference between any two values among δ(1)=r(−α)−r(+α), δ(2)=r(120−α)−r(120+α), and δ(3)=r(240−α)−r(240+α) is set to be equal to or smaller than a predetermined value (20 μm), the K-th order component of cogging torque can be made equal to or smaller than 0.015 mNm.

In the case where the slot opening angle is 3°, α is set at, for example, α=2°.

Generally, with respect to the maximum value δmax of the absolute value of the difference between any two values of N values of δ(i) with respect to i=1 to N, the following parameter (unit is $mT^2$) is defined.

[Expression 4]

$$\frac{\delta\max\left(\frac{Lm}{\mu r}\right)^2 Br^2}{\left(\frac{Lm}{\mu r}+g\right)^2} \tag{4}$$

If this value is set to be equal to or smaller than a predetermined value, the K-th order component of cogging torque can be reduced regardless of the motor design.

Here, Lm is the thickness (m) of the permanent magnet, μr is a recoil permeability, g is an air gap length (m), and Br is the residual magnetic flux density (T) of the permanent magnet.

In the permanent magnet motor according to embodiment 5, by the same theory as in embodiment 1, if the parameter shown by expression (4) is set to be equal to or smaller than $2.2\times10^{-5}$ ($mT^2$), an effect is obtained that the K-th order component of cogging torque can be reduced to only 0.3% or less of the rated torque. In addition, if the permanent magnet motor is applied to an electric power steering apparatus, a preferable steering feeling can be obtained, and at the same time, an electric power steering apparatus with small vibration noise can be obtained.

INDUSTRIAL APPLICABILITY

The present invention relates to the configuration of a stator iron core for reducing cogging torque of a permanent magnet motor, and is applicable to a wide variety of stators of a rotary electric machine.

The invention claimed is:

1. A permanent magnet motor, wherein a relationship of mN≠K is satisfied with respect to an integer m, where the pole number of a rotor is K and the number of partial iron cores of a stator iron core of a stator is N, and N values of r(θ+(i−1)×360°/N), . . . , r(θ+(N−1)×360°/N), with respect to i=1 to N, are set to be equal so that the absolute value of the difference between any two values of the N values, due to a clearance for fitting the partial iron cores and manufacturing deviations, becomes equal to or smaller than a predetermined value, where r(θ) is an inner radius defined as, on a plane perpendicular to a rotary shaft of the rotor, a distance from the center of the rotary shaft to a point on a surface of the stator iron core facing to the rotor at which an angle from a fitting portion of the partial iron core is θ on the perpendicular plane, θ taking a value of 0 to 360°/N, wherein a parameter calculated by the following expression (1) is set to be equal to or smaller than a predetermined value,

[Expression 1]

$$\frac{\Delta M\left(\frac{Lm}{\mu r}\right)^2 Br^2}{\left(\frac{Lm}{\mu r}+g\right)^2}$$

wherein ΔM is the average value of Δmax with respect to the axial direction height of the stator iron core, Δmax being the maximum value, with respect to θ, of the absolute value of the difference between any two values among the N values of r(θ+(i−1)×360°/N), . . . , r(θ+(N−1)×360°/N), with respect to i=1 to N, wherein Lm is the thickness (m) of the permanent magnet, μr is a recoil permeability, g is an air gap length (m), and Br is the residual magnetic flux density (T) of the permanent magnet, and wherein the predetermined value for the parameter is $2.2\times10^{-5}$ ($mT^2$).

2. A permanent magnet motor, wherein a relationship of mN≠K is satisfied with respect to an integer m, where the pole number of a rotor is K and the number of partial iron cores of a stator iron core of a stator is N, and N values of r(θ+(i−1)×360°/N), . . . , r(θ+N−1)×360°/N), with respect to i=1 to N, are set to be equal so that the absolute value of the difference between any two values of the N values, due to a clearance for fitting the partial iron cores and manufacturing deviations, becomes equal to or smaller than a predetermined value, where r(θ) is an inner radius defined as, on a plane perpendicular to a rotary shaft of the rotor, a distance from the center of the rotary shaft to a point on a surface of the stator iron core facing to the rotor at which an angle from a fitting portion of the partial iron core is θ on the perpendicular plane, θ taking a value of 0 to 360°/N, a parameter calculated by the following expression (2) is set to be equal to or smaller than a predetermined value, $$\frac{\Delta(\theta)\left(\frac{Lm}{\mu r}\right)^2 Br^2}{\left(\frac{Lm}{\mu r}+g\right)^2}$$ [Expression 2]

where Δ(θ) is a periodic shape difference Δ(θ)=r(θ)max−r(θ)min per 360°/N, r(θ)max and r(θ)min being the maximum value and the minimum value among the N values of r(θ+(i−1)×360°/N), . . . , r(θ+(N−1)×360°/N), with respect to i=1 to N, and wherein the predetermined value for the parameter is $2.2\times10^{-5}$ ($mT^2$).

3. The permanent magnet motor according to claim 1, wherein a relationship of L/N=n is satisfied with respect to an integer n, where L is the slot number of the stator.

4. The permanent magnet motor according to claim 3, wherein the value of N is set at the smallest value among integers satisfying the relationship of mN≠K with respect to the integer m and satisfying the relationship of L/N=n with respect to the integer n.

5. The permanent magnet motor according to claim 3, wherein the pole number K of the rotor is 10, the slot number L of the stator is 12, and the number N of the partial iron cores is 3.

6. The permanent magnet motor according to claim 3, wherein the N number of the partial iron cores each composed of the n number of continuous teeth are joined into a circular tube shape.

7. The permanent magnet motor according to claim 6, wherein the fitting portion of the stator is formed such that the absolute value of the difference between any two values of N values of δ(i) with respect to i=1 to N (N is an integer that is the number of the partial iron cores), δ(i) being defined as the difference between radial direction distances from the center of the rotary shaft of the rotor to the inner circumference of the stator, on both sides of the fitting portion of the stator iron core, which is represented as δ(i)=r((i−1)×360°/N−α)−r((i−1)×360°/N+a), where α is an angle larger than the angle of the opening width of the slot of the stator and sufficiently smaller than 360°/L.

8. The permanent magnet motor according to claim 7, wherein a parameter calculated by the following expression is set to be equal to or smaller than a predetermined value, $$\frac{\delta\max\left(\frac{Lm}{\mu r}\right)^2 Br^2}{\left(\frac{Lm}{\mu r}+g\right)^2}$$ [Expression 3]

where δmax is the maximum value of the absolute value of the difference between any two values of N values of δ(i) with respect to i=1 to N.

9. The permanent magnet motor according to claim 8, wherein the predetermined value for the parameter is $2.2\times10^{-5}$ ($mT^2$).

10. The permanent magnet motor according to claim 6, wherein the N number of the partial iron cores are joined, each being formed by laminating a plurality of sheets of planar magnetic materials punched by the same press mold.

11. The permanent magnet motor according to claim 6, wherein a foldable joint portion is provided between each adjacent teeth of the n number of the continuous teeth such that the continuous teeth are joined at the foldable joint portion.

12. The permanent magnet motor according to claim 6, wherein the armature winding wound on the n number of the continuous teeth is a conductive wire continuously wound on two or more of the teeth.

13. The permanent magnet motor according to claim 1, wherein the permanent magnet motor is used for a motor for driving electric power steering.

14. The permanent magnet motor according to claim 2, wherein a relationship of L/N=n is satisfied with respect to an integer n, where L is the slot number of the stator.

15. The permanent magnet motor according to claim 14, wherein the value of N is set at the smallest value among integers satisfying the relationship of mN≠K with respect to the integer m and satisfying the relationship of L/N=n with respect to the integer n.

16. The permanent magnet motor according to claim 14, wherein the N number of the partial iron cores each composed of the n number of continuous teeth are joined into a circular tube shape.

17. The permanent magnet motor according to claim 16, wherein the fitting portion of the stator is formed such that the absolute value of the difference between any two values of N values of δ(i) with respect to i=1 to N (N is an integer that is the number of the partial iron cores), δ(i) being defined as the difference between radial direction distances from the center of the rotary shaft of the rotor to the inner circumference of the stator, on both sides of the fitting portion of the stator iron core, which is represented as δ(i)=r((i−1)×360°/N−α)−r((i−1)×360°/N+α), where α is an angle larger than the angle of the opening width of the slot of the stator and sufficiently smaller than 360°/L, wherein a parameter calculated by the following expression (3) is set to be equal to or smaller than a predetermined value, $$\frac{\delta\max\left(\frac{Lm}{\mu r}\right)^2 Br^2}{\left(\frac{Lm}{\mu r}+g\right)^2}$$ [Expression 3]

where δ max is the maximum value of the absolute value of the difference between any two values of N values of δ(i) with respect to i=1 to N and wherein the predetermined value for the parameter is $2.2\times10^{-5}$ ($mT^2$).

* * * * *